US007267303B1

(12) United States Patent
Teter et al.

(10) Patent No.: US 7,267,303 B1
(45) Date of Patent: *Sep. 11, 2007

(54) METHOD AND SYSTEM FOR PROVIDING CRUCIFORM STEERED, BENT BICONIC AND PLASMA SUPPRESSION FOR MAXIMUM ACCURACY

(75) Inventors: Roger D. Teter, Sunnyvale, CA (US); Steven A. Dunn, Livermore, CA (US); J. William Meyer, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/990,393

(22) Filed: Nov. 18, 2004

Related U.S. Application Data

(63) Continuation-in-part of application No. 10/849,268, filed on May 18, 2004.

(51) Int. Cl.
*B64G 1/00* (2006.01)
(52) U.S. Cl. .................. 244/159.1; 244/158.9
(58) Field of Classification Search ............ 244/158.9, 244/159.1, 171.7, 171.8, 158.1
See application file for complete search history.

(56) References Cited

U.S. PATENT DOCUMENTS

| | | | | | |
|---|---|---|---|---|---|
| 2,468,820 | A | * | 5/1949 | Goddard | 244/117 A |
| 2,995,317 | A | * | 8/1961 | Schoppe | 60/768 |
| 3,028,129 | A | * | 4/1962 | Faillie | 244/117 A |
| 3,107,619 | A | * | 10/1963 | Daniels | 244/117 A |
| 3,114,319 | A | * | 12/1963 | Smith | 343/872 |
| 3,128,965 | A | * | 4/1964 | Ziemer | 343/705 |
| 3,258,916 | A | * | 7/1966 | Lehmann | 239/265.25 |
| 3,259,065 | A | * | 7/1966 | Ross et al. | 244/3.1 |
| 3,267,857 | A | * | 8/1966 | Lindberg, Jr. | 244/159.1 |
| 3,277,375 | A | * | 10/1966 | Nelson et al. | 455/64 |
| 3,298,312 | A | * | 1/1967 | Adams | 244/159.1 |
| 3,325,123 | A | * | 6/1967 | Null | 244/166 |
| 3,392,941 | A | * | 7/1968 | Cason, III | 244/3.21 |
| 3,536,011 | A | * | 10/1970 | Casadevall et al. | 244/159.1 |
| 3,620,484 | A | * | 11/1971 | Fritz et al. | 244/130 |
| 3,731,893 | A | * | 5/1973 | Stalmach, Jr. | 244/171.8 |

(Continued)

OTHER PUBLICATIONS

"Freon." Wikipedia, The Free Encyclopedia. May 6, 2004, 01:01 UTC. Wikimedia Foundation, Inc. Jul. 29, 2006 <http://en.wikipedia.org/w/index.php?title=Freon&oldid=56041401>.*

(Continued)

*Primary Examiner*—Stephen A. Holzen
(74) *Attorney, Agent, or Firm*—McDermott Will & Emery LLP

(57) ABSTRACT

A system for reducing plasma induced communication disruption is disclosed. The system utilizes an electrophilic gas injectant, bent reentry vehicle nose shaping and a number of flaps configured to provide 3-axis steering capability. Injecting electrophilic gas injectant into plasma accomplishes reduction of plasma induced communication disruption by removing free electrons in the plasma which causes the communication disruption. For reentry vehicles, a bent biconic nose also reduces plasma effect during reentry. By combining electrophilic gas injection and bent nose shaping, the system reduces and/or eliminates plasma induced communication disruption, such as, GPS communication blackout, for a reentry vehicle during reentry. Furthermore, the 3-axis steering capability renders the reentry vehicle more maneuverable. Performance of the reentry vehicle during reentry, such as, target accuracy, is thus improved.

5 Claims, 18 Drawing Sheets

U.S. PATENT DOCUMENTS

| | | | | |
|---|---|---|---|---|
| 3,745,928 | A * | 7/1973 | Kinnaird et al. | 244/159.1 |
| 3,785,591 | A * | 1/1974 | Stalmach, Jr. | 244/171.8 |
| 3,883,096 | A * | 5/1975 | Osofsky | 244/117 A |
| 4,014,485 | A * | 3/1977 | Kinnaird et al. | 244/117 A |
| 4,650,139 | A * | 3/1987 | Taylor et al. | 244/172.4 |
| 4,790,499 | A * | 12/1988 | Taylor et al. | 244/172.2 |
| 4,917,335 | A * | 4/1990 | Tidman | 244/130 |
| 4,961,384 | A * | 10/1990 | Sayles | 102/519 |
| 5,323,322 | A * | 6/1994 | Mueller et al. | 701/215 |
| 5,457,471 | A * | 10/1995 | Epperson, Jr. | 343/872 |
| 5,789,867 | A * | 8/1998 | Westendorp et al. | 315/111.21 |
| 5,797,563 | A * | 8/1998 | Blackburn et al. | 244/130 |
| 5,808,732 | A * | 9/1998 | Williams | 356/139.01 |
| 6,056,237 | A * | 5/2000 | Woodland | 244/3.15 |
| 6,072,433 | A * | 6/2000 | Young et al. | 342/386 |
| 6,098,547 | A * | 8/2000 | West | 102/214 |
| 6,239,767 | B1 * | 5/2001 | Rossi et al. | 343/882 |
| 6,298,289 | B1 * | 10/2001 | Lloyd et al. | 701/13 |
| 6,502,785 | B1 * | 1/2003 | Teter et al. | 244/3.22 |
| 6,527,221 | B1 * | 3/2003 | Kremeyer | 244/1 N |
| 6,691,026 | B2 * | 2/2004 | Odinak et al. | 701/202 |
| 2002/0159215 | A1 * | 10/2002 | Siess | 361/232 |
| 2004/0118973 | A1 * | 6/2004 | Malmuth et al. | 244/75 R |
| 2004/0198388 | A1 * | 10/2004 | Blitz | 455/456.1 |
| 2005/0061908 | A1 * | 3/2005 | Kremeyer | 244/1 N |
| 2005/0065779 | A1 * | 3/2005 | Odinak | 704/201 |

OTHER PUBLICATIONS

"Haloalkane." Wikipedia, The Free Encyclopedia. Jul. 26, 2006, 18:41 UTC. Wikimedia Foundation, Inc. Jul. 29, 2006 <http://en.wikipedia.org/w/index.php?title=Haloalkane&oldid=66007255>.*

"Electrophile." Wikipedia, The Free Encyclopedia. Apr. 12, 2004, 17:48 UTC. Wikimedia Foundation, Inc. Jul. 29, 2006 <http://en.wikipedia.org/w/index.php?title=Electrophile&oldid=61051170>.*

"Ionization Energies of Gas-Phase Molecules", Sharon G. Lias. See pp. 1 and 8.*

Chandler, Nikki. "Shuttle Blackout Myth Persists." Mobile Radio Technology Mar. 1, 2003 1. Mar. 3, 2007 <http://mrtmag.com/mag/radio_shuttle_blackout_myth/>.*

Chandler, Nikki; "Shuttle Blackout Myth Persists", Mar. 1, 2003, pp. 1-5.

Nazarenko et al, "Numerical Modeling Of Wind-Tunnel Experiments On Supersonic Flows Of Weakly Ionised Gases", www.maths.warwick.ac.uk, pp. 1-5.

www.answers.com, "ion", pp. 1-6.

www.answers.com, "electrophile", pp. 1-3.

www.answers.com, "electrophilic substitution", pp. 1-3.

* cited by examiner

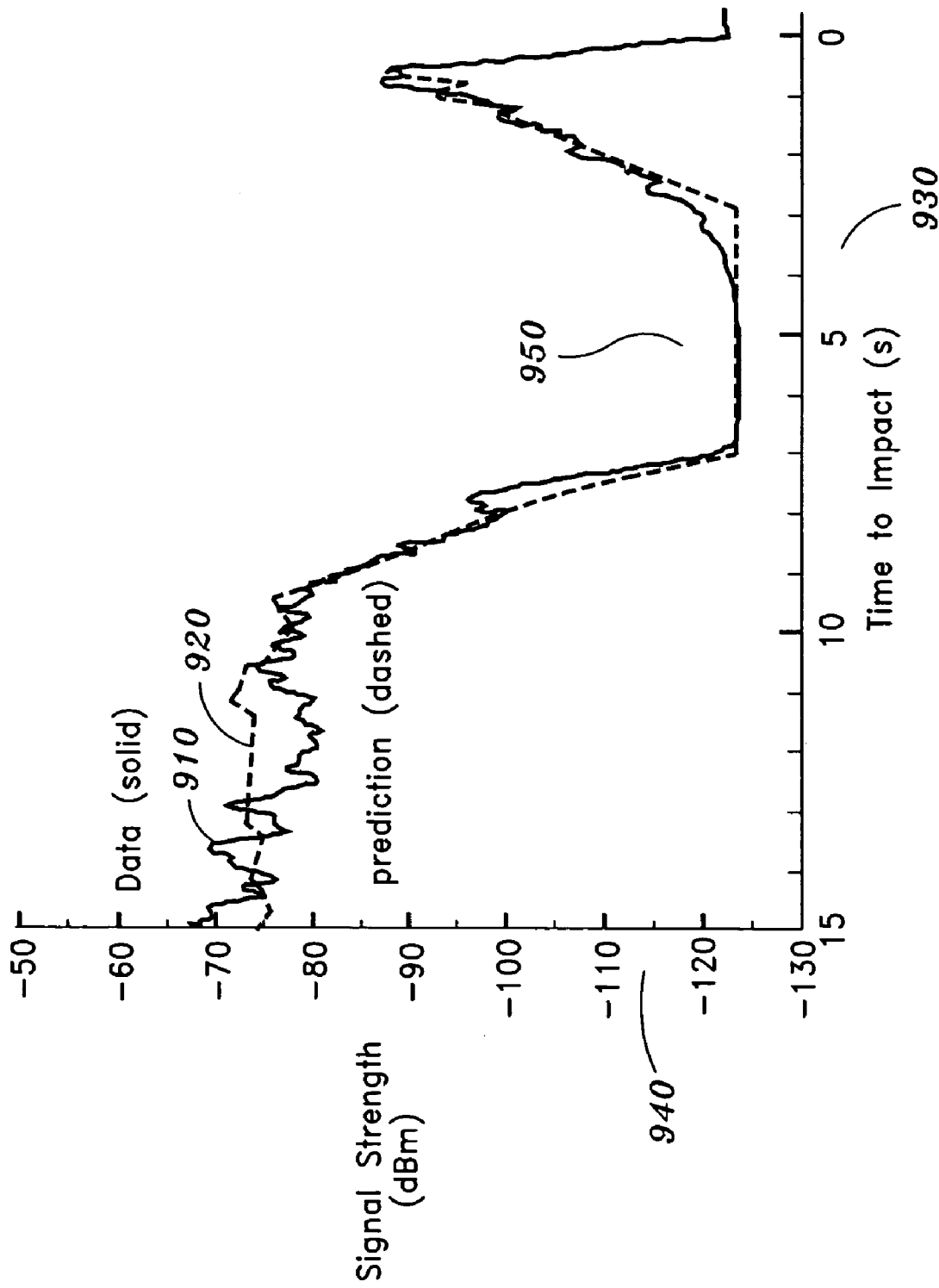

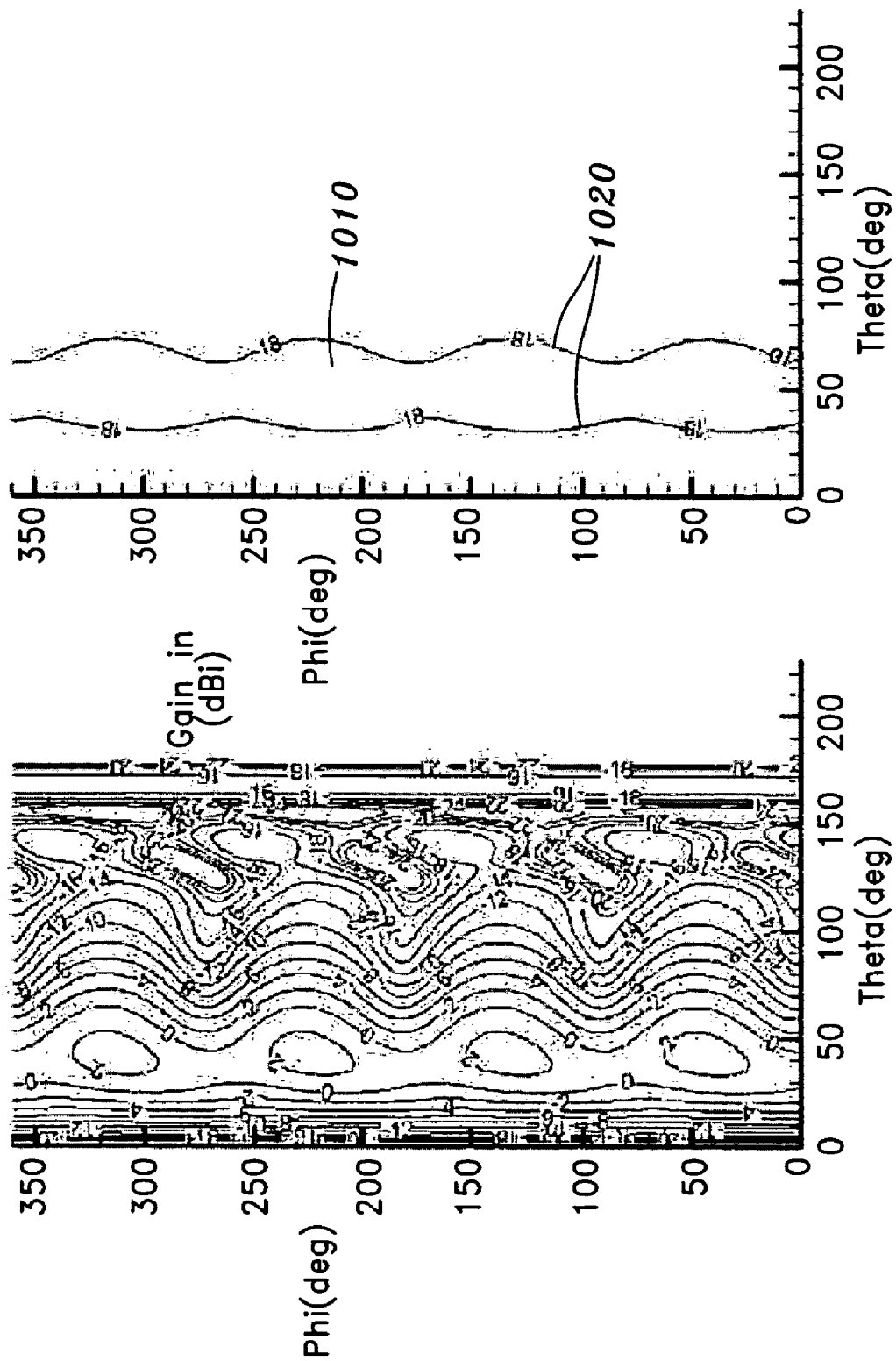

METHOD AND SYSTEM FOR PROVIDING CRUCIFORM STEERED, BENT BICONIC AND PLASMA SUPPRESSION FOR MAXIMUM ACCURACY

CROSS-REFERENCE(S) TO RELATED APPLICATION(S)

The present application is a continuation-in-part application of co-pending U.S. patent application Ser. No. 10/849,268, entitled "SYSTEM AND METHOD FOR REDUCING PLASMA INDUCED COMMUNICATION DISRUPTION UTILIZING ELECTROPHILIC INJECTANT AND SHARP REENTRY VEHICLE NOSE SHAPING", filed on May 18, 2004, the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

BACKGROUND OF THE INVENTION

The present invention generally relates to methods and systems for reducing plasma induced communication disruption, and in particular to methods and systems for reducing plasma induced communication disruption utilizing electrophilic injectant and sharp reentry vehicle nose shaping.

Blazing fiery descent of space-borne objects into the Earth atmosphere is a well known phenomenon. To avoid damage or destruction during the fiery reentry phase, reentry vehicles are usually equipped with heat-shields known as the thermal protection system (TPS). With a TPS shield, it is the outer layer of TPS, rather than the structure of the reentry vehicle, that is subject to the intense heat and pressures during reentry. However, the TPS itself is not indestructible. For instance, the outer layer of TPS ablates away under the extreme heat and pressures of reentry phase. As the TPS chars and partly burns away, a layer of plasma is created around the reentry vehicle from the ablation process.

Plasma is a state of matter in which molecules or atoms are broken down to free electrons and positively charged ions—atoms with electrons stripped away—under extreme heat. The TPS ablation releases certain easily ionizable trace elements in the TPS—mainly the low ionization potential alkali metals such as Na, K, and Ca—into a thin layer of flow around the reentry vehicle. A significant portion of these atoms ionize when they are subject to the high temperatures that exist in the thin boundary layer of flow around the reentry vehicle. Equal numbers of singly ionized positive ions ($Na^+$, $Ca^+$, and $K^+$) and free electrons ($e^-$) are generated, and an overall charge balance is maintained. Although these trace elements are usually present only at very low levels in the TPS material, on the order of tens of parts per million, they make a large contribution to the free electron concentration in the vehicle boundary layer.

Another source of plasma is from ionization of the air molecules, primarily in the region of the nose tip shock wave. In this region just at the front of the vehicle, the bow shock wave is at right angle to the flow and produces much higher temperatures than the flow along the sides of the vehicle. Immediately behind this right-angle shock wave, the air is highly dissociated and partially ionized to a mixture of N, O, NO, $N_2$, $O_2$, $NO^+$, and $e^-$ molecules and ions. The most easily ionizable air derived species is NO, making creation of $NO^+$ the principal source of "clean air" ionization free electrons. While not present in ambient air in significant amounts, NO is formed rapidly when the air is dissociated by the high temperatures at the nose tip. The relatively intense plasma formed at the nose tip flows back along the vehicle sides and eventually around the back into the wake, thinning as it goes and mixing with the boundary layer flow with its alkali metal produced ions. Hence, there are two major plasma contributors, one from the nose tip bow shock wave and the other from the ablating TPS layer with its alkali trace elements.

One result of plasma formation around a reentry vehicle is communication disruption during reentry. The free electrons racing around in the plasma interfere with the electromagnetic waves used for radio communication (the RF signals), resulting in communication disruption. The communication blackouts of space capsules or space shuttles that occur during their reentry into the Earth atmosphere are caused by this plasma effect.

Communication disruption during reentry affects reentry vehicles in many ways. For example; the plasma effect adversely affects the performance of reentry vehicles with missile launch capability. One method of maintaining the performance of the reentry vehicles is to guide the reentry vehicles utilizing a GPS (global positioning system). GPS is typically used to control various accuracy parameters required for low-yield nuclear or conventional payloads carried within reentry vehicles, such as, angle of attack, flight path angle, and angle of obliquity requirements, in order to achieve maximum mission effectiveness. However, the plasma effect disrupts the vehicles' communication with the GPS satellites, causing so-called GPS blackouts during reentry. Because the reentry vehicles cannot be guided by GPS during the critical reentry phase, performance is negatively affected by the plasma induced communication disruption.

Prior methods for controlling reentry vehicles during the GPS blackout using flaps, fins, moveable nose tips and small control rockets have been developed. Other exotic, difficult to design and manufacture high-lift shapes have also been proposed at the concept level.

The technology for reducing or suppressing plasma effects, thus, would provide numerous benefits including, for example, making space flights safer and making missiles more accurate. Hence, it would be desirable to provide methods and systems that are capable of reducing plasma induced communication disruption during reentry.

SUMMARY OF THE INVENTION

In one embodiment, a system for reducing plasma induced communication disruption for a flight vehicle traveling at hypersonic speed is provided. The system utilizes an electrophilic injectant and bent biconic reentry vehicle nose shaping. The system includes an electrophilic gas injectant and an electrophilic gas injection system for injecting the electrophilic gas injectant into plasma near a communication antenna mounted on the flight vehicle. The electrophilic gas injectant is injected during a plasma induced communication disruption phase of a hypersonic flight. Because the plasma induced communication disruption is caused by free electrons in plasma, the communication disruption can be reduced or ameliorated by reducing the electron density in the plasma. Reduction of the free electrons in plasma can be accomplished by injecting an electrophilic gas injectant into the plasma. In one embodiment, hexafluoroethane ($C_2F_6$) gas or Freon is employed as the electrophilic gas injectant.

The plasma effect is noticeable at hypersonic speeds, especially at Mach 8 or higher. Thus, the system of the present invention can be utilized for any flight vehicles traveling at hypersonic speeds, including reentry vehicles during reentry into atmosphere, space shuttles, hypersonic jets, booster gliders, or any time there exists plasma induced communication disruption.

The present invention is particularly effective when the electrophilic gas injectant is injected into a separated-flow vortex near the communication antenna. Due to the fluid dynamic properties of separated-flow vortices, also known as eddies, materials entrained in eddy vortices tend to remain within the vortices, thereby improving the effectiveness of the present invention, as the electrophilic gas tends to remain near the communication antenna despite the turbulent flow currents around the reentry vehicle.

In another embodiment, a system for reducing plasma induced communication blackout for a reentry vehicle during reentry is provided. The system includes a multi-section sharp nose for the reentry vehicle, an electrophilic gas injectant, and an electrophilic gas injection system for injecting the electrophilic gas injectant into plasma near a communication antenna during a plasma induced communication disruption phase of reentry. The sharp nose comprises two or more nose cone sections with a sharper nose cone section placed in front of a less sharp nose cone section. The multi-section sharp nose and electrophilic gas injectant each by itself reduces plasma induced communication disruption and combining them further reduces or eliminates plasma induced communication blackouts during reentry.

In yet another embodiment, a reentry vehicle with improved targeting accuracy utilizing a process for reducing plasma induced GPS blackout during reentry is provided. The reentry vehicle comprises a multi-section sharp nose and an electrophilic gas injection system for injecting an electrophilic gas injectant into plasma near a base-mounted GPS antenna during a plasma induced GPS communication disruption phase of reentry. For the GPS-guided reentry vehicles, the GPS blackout caused by plasma effect during reentry severely undermines the targeting accuracy because the reentry vehicles cannot be guided by GPS during the critical reentry phase. Thus, by reducing the plasma induced GPS blackout during reentry, the present invention provides an effective system and method for improving targeting accuracy for a GPS-guided reentry vehicle.

In a further embodiment, a system for reducing plasma induced communication disruption is disclosed. The system utilizes an electrophilic gas injectant, bent reentry vehicle nose shaping and a number of flaps configured to provide 3-axis steering capability. For reentry vehicles, a bent biconic nose further reduces plasma effect during reentry. By combining electrophilic gas injection and bent nose shaping, the system reduces and/or eliminates plasma induced communication disruption, such as, GPS communication blackout, for a reentry vehicle during reentry. Furthermore, the 3-axis steering capability renders the reentry vehicle more maneuverable. Performance of the reentry vehicle during reentry, such as, target accuracy, is thus improved.

The present invention may offer a number of benefits and/or advantages. For example, improved performance can be achieved including greater range with improved vehicle control and improved velocity management, along with continuous/nearly continuous GPS communication for greater accuracy.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings:

FIG. 9 illustrates a close match between the empirically observed plasma attenuation of signals from a reentry vehicle during reentry and the predictions of the computational method;

FIG. 10a shows a predicted directional gain plot for signals received or transmitted by a reentry vehicle calculated by a computational method without accounting for plasma effect;

FIG. 10b illustrates communication disruption effect of plasma for a blunt nose reentry vehicle during reentry;

DETAILED DESCRIPTION OF SPECIFIC EMBODIMENTS

One or more embodiments of the present invention will now be described. When a space-borne object enters atmosphere from space, the object is traveling at a very high speed due to the pull of gravity—i.e., the gravitational acceleration. Since space is basically vacuum, there is no resistance or friction from air until the object hits the upper layers of atmosphere, and the falling object typically reaches a speed many times the speed of sound by the time it encounters outer atmosphere. An object traveling at a hypersonic speed in atmosphere creates a large shockwave, especially in the wake of the object's flight path, producing intense pressures and heat.

Figure 1:
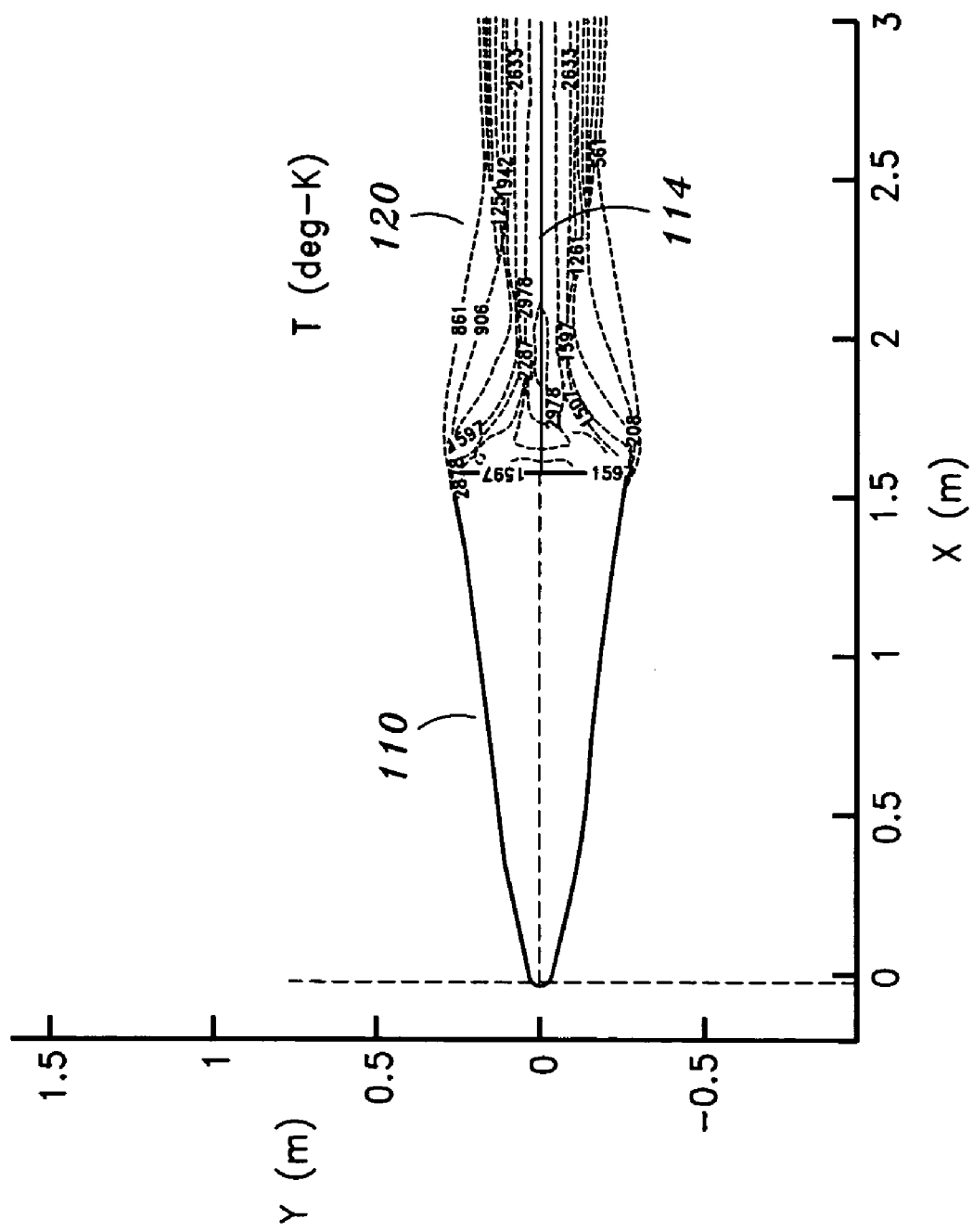
FIG. 1 illustrates temperature distribution in the wake of a reentry vehicle during reentry into atmosphere.

FIG. 1 illustrates temperature distribution in the wake of a reentry vehicle during reentry into atmosphere. As shown in FIG. 1, the reentry vehicle 110 is subject to intense heat and pressures during reentry into atmosphere, reaching a temperature of 3,000 degree Kelvin or higher in the wake of the reentry vehicle. In FIG. 1, the reentry vehicle 110 is represented in a coordinate with origin at the center of the nose tip end of the reentry vehicle 110. The X and Y axes are in the unit of distance in meters from the origin. The reentry vehicle 110 is symmetric about center line 114. Shown in FIG. 1 are temperature contours in the wake of a reentry vehicle at 42 Kft altitude during reentry. Temperature contours 120 in the wake of the reentry vehicle 110 are computed utilizing computational fluid dynamics simulations (CFD) which are well known to those skilled in the art of fluid and aerodynamics.

Figure 2:
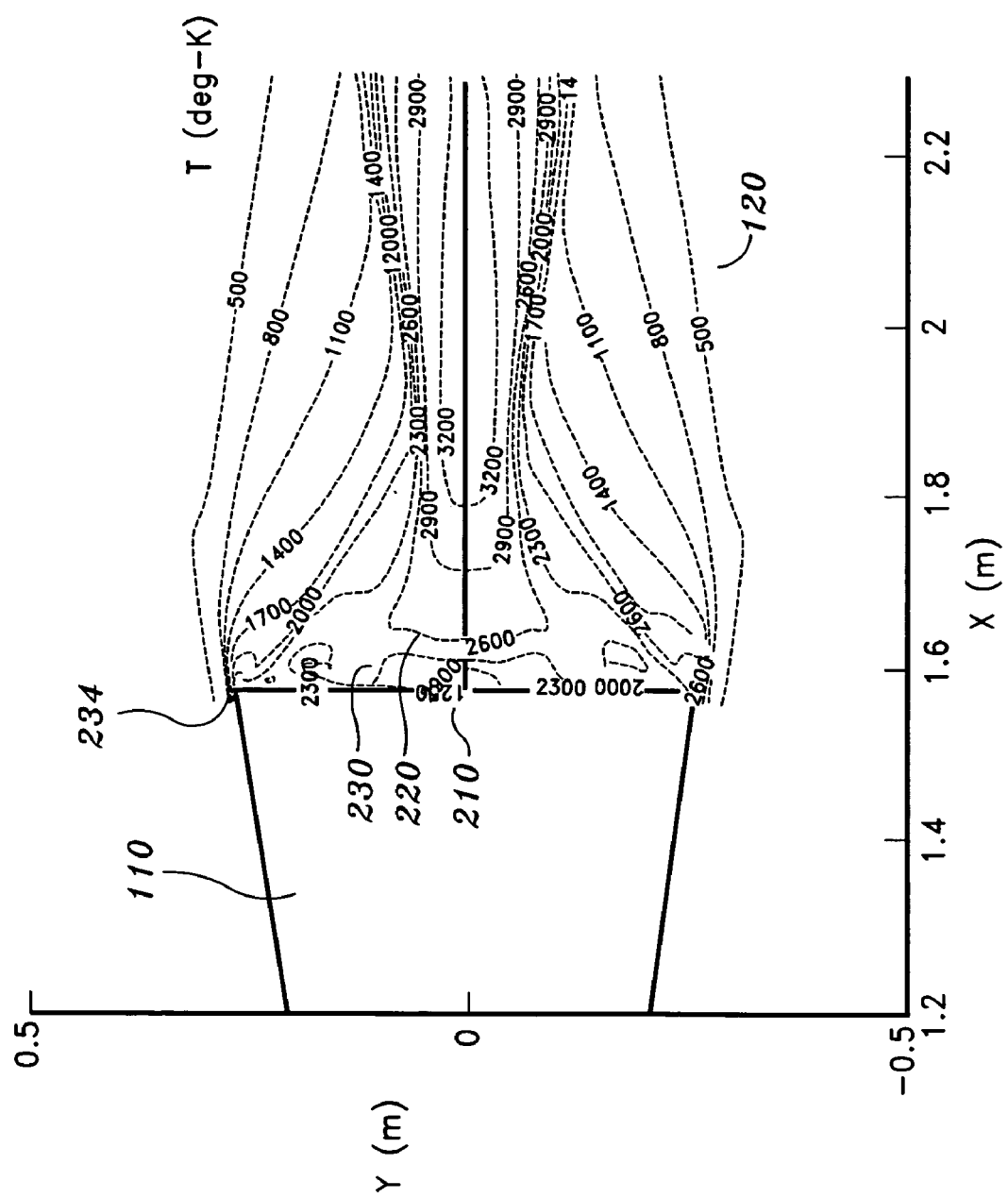
FIG. 2 illustrates a close-up view of temperature distribution near the base of a reentry vehicle during reentry into atmosphere.

FIG. 2 illustrates a close-up view of temperature distribution near the base of a reentry vehicle during reentry into atmosphere. Shown in FIG. 2 are temperature contours 120 near the base 210 of the reentry vehicle 110 at 42 Kft altitude during reentry. In particular, FIG. 2 shows temperature contour for 2600 degree Kelvin (220) and temperature contour for 2300 degree Kelvin (230) near the base 210 of the reentry vehicle 110. The source of this hot gas is the thin plasma layer flowing past corner 234 of the reentry vehicle 110 from the front parts thereof. Extreme heat and pressures cause the outer layer of the thermal protection system (TPS) of the reentry vehicle 110 to burn away or ablate away, producing plasma around the reentry vehicle 110.

Figure 3:
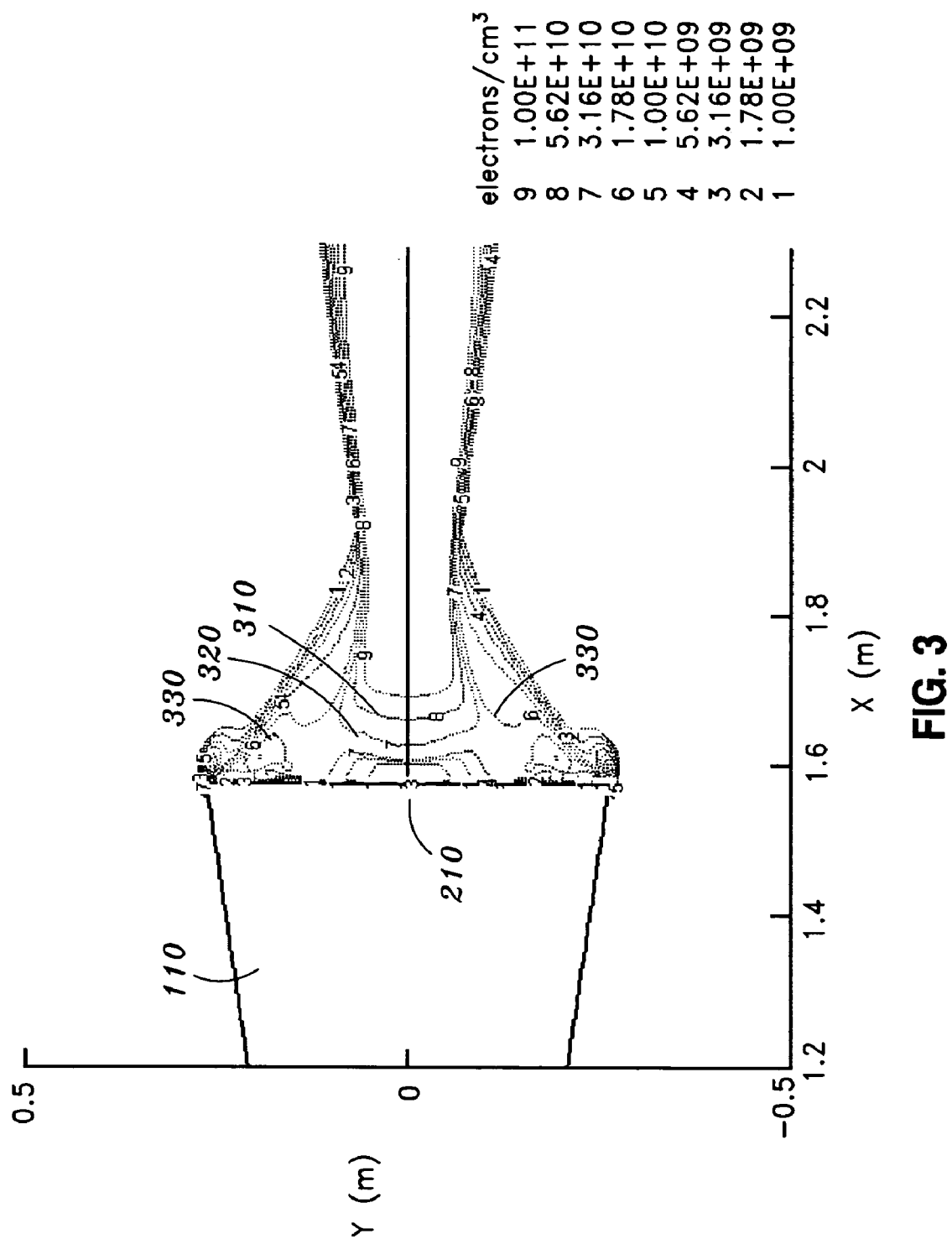
FIG. 3 illustrates electron density distribution due to plasma formed near the base of a reentry vehicle during reentry into atmosphere.

FIG. 3 illustrates electron density distribution due to plasma formed near the base of a reentry vehicle during reentry into atmosphere. Shown in FIG. 3 are electron density contours near the base 210 of the reentry vehicle 110 at 42 Kft altitude during reentry. In particular, FIG. 3 shows electron density contour for $5.62 \times 10^{10}$ electrons/cm$^3$ (310), electron density contour for $3.16 \times 10^{10}$ electrons/cm$^3$ (320), and electron density contour for $1.78 \times 10^{10}$ electrons/cm$^3$ (330), demonstrating creation of free electrons with densities around $3 \times 10^{10}$ electrons/cm$^3$ near the base 210 of the reentry vehicle 110 during reentry. The electron density contours are also computed utilizing computational fluid dynamics simulations (CFD) well known to those skilled in the art.

As well known to those skilled in the art, the plasma natural frequency is approximately: $8,978 \times \sqrt{N_e}$ Hz, where $N_e$ is the electron density in electrons/cm$^3$. For $N_e = 3.0 \times 10^{10}$ electrons/cm$^3$, then, the plasma frequency works out to be 1.56 GHz, which is essentially the L1 frequency for the GPS satellites (1,575.42 MHz). The plasma natural frequency is the frequency of electron cloud in plasma oscillating against the positively charged ion cloud. As also well known to those skilled in the art, a charged oscillator will absorb electromagnetic waves at the oscillator's natural or normal mode frequencies. Thus, most of the RF waves or RF signals at L1 frequency used for GPS communication will be absorbed by the electron cloud oscillator of the plasma when the electron density is around $3.0 \times 10^{10}$ electrons/cm$^3$ near the base 210 of the reentry vehicle 110 during reentry, as shown in FIG. 3. Therefore, the plasma formed near the base 210 of the reentry vehicle 110 during reentry severely attenuates L1 frequency RF signals, disrupting GPS communication with the reentry vehicle. In a similar manner, the plasma attenuates communication signals at other RF frequencies, as the electron densities in the plasma vary widely during reentry.

In one embodiment, a system for reducing plasma induced communication disruption for a flight vehicle traveling at a hypersonic speed is provided. The system comprises an electrophilic gas injectant, and an electrophilic gas injection system for injecting the electrophilic gas injectant into plasma near a communication antenna mounted on the flight vehicle. Because the plasma induced communication disruption is caused by free electrons in plasma, the communication disruption can be reduced or ameliorated by reducing the electron density in the plasma. The free electrons in plasma can be reduced or removed by injecting an electrophilic gas into the plasma. An electrophilic gas is a gaseous state of matter (molecules or atoms) with tendencies to bind with free electrons.

Figure 4:
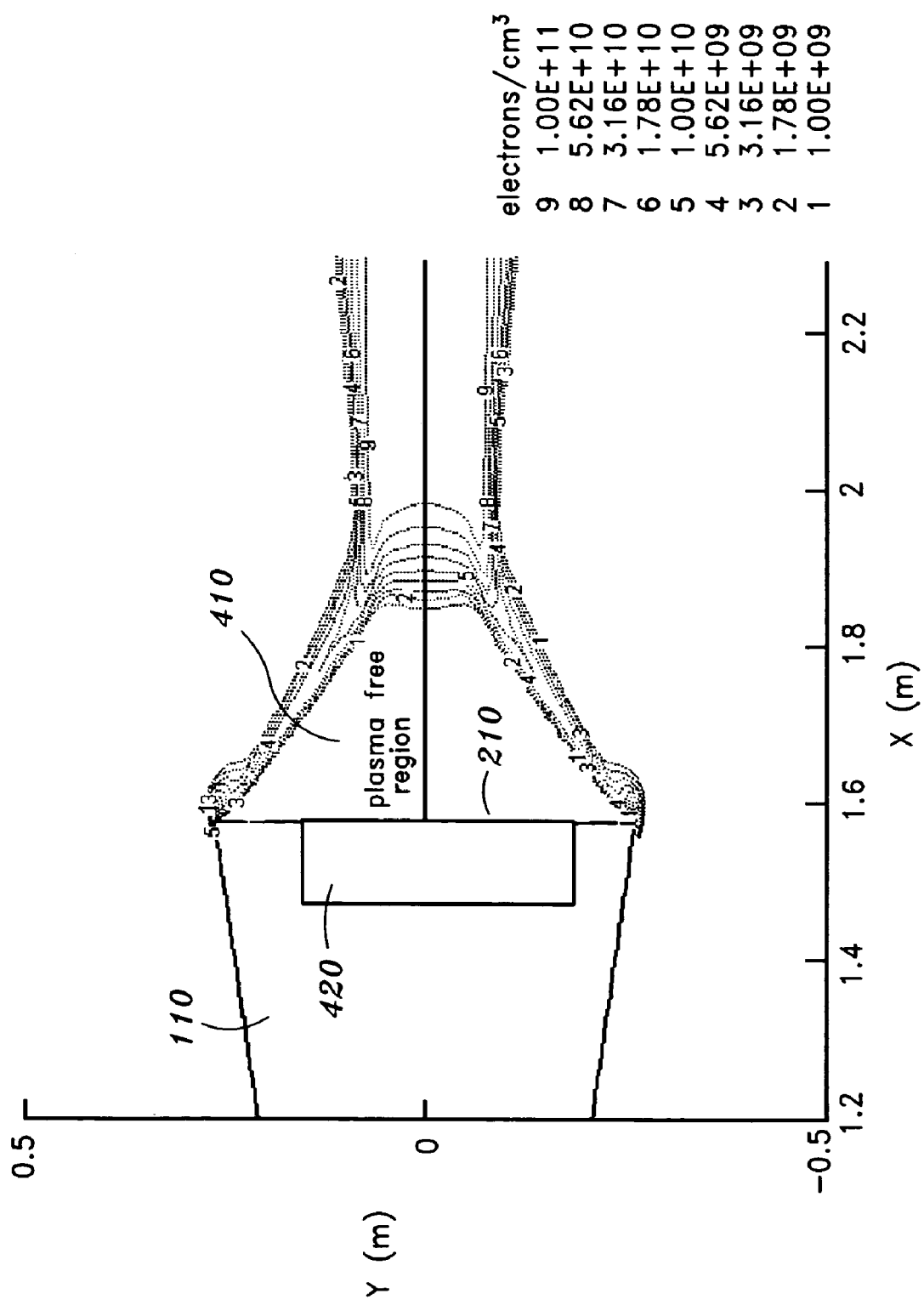
FIG. 4 illustrates electron density distribution in the wake of a reentry vehicle when hexafluoroethane (C2F6) gas is injected into plasma near the base of the reentry vehicle according to one embodiment of the present invention.

FIG. 4 illustrates electron density distribution in the wake of a reentry vehicle when hexafluoroethane ($C_2F_6$) gas is injected into plasma near the base of the reentry vehicle according to one embodiment of the present invention. In one embodiment, hexafluoroethane ($C_2F_6$) gas or Freon, as is more commonly known, is employed as the electrophilic gas injectant. Shown in FIG. 4 are electron density contours near the base 210 of the reentry vehicle 110 at 42 Kft altitude during reentry when hexafluoroethane ($C_2F_6$) gas is injected into the plasma near the base 210 of the reentry vehicle 110 at a rate of 100 grams per second. As shown in FIG. 4, hexafluoroethane ($C_2F_6$) gas injection produces a large electron free or plasma free region (410) near the base 210 of the reentry vehicle 110, as the free electrons are scooped up by the fluorine atoms, the active electrophilic element in $C_2F_6$. The fluorine atoms in $C_2F_6$ attaches free electrons to form fluorine ions which do not interfere with RF signal transmissions.

The basis of the electron density concentration and distribution calculation shown in FIG. 4 is an equilibrium chemical composition computation that is embedded in the computational fluid dynamics (CFD) simulation. The chemical composition is determined by the method of Gibbs free energy minimization well known to those skilled in the art. A mixture of forty (40) chemical species from seven (7) elements is considered in making this calculation based on the fact that the injected $C_2F_6$ will be dissociated and reacted with the soup of high temperature ablation gases and air existing in the region. In particular, the elements H, C, N, O, Ca, Na, K, and the chemical species $N_2$, $O_2$, H, N, O, CO, $CO_2$, $C_2$, $H_2$, OH, $H_2O$, NO, HF, F, $F_2$, CF, $CF_2$, $COF_2$, COF, $CF_3$, $CF_4$, $C_2F_4$, $C_2F_6$, $C_3$, C(solid), $NO^+$, Na, $Na^+$, K, $K^+$, Ca, $Ca^+$, $F^-$, NaF, CaF, KF, NOF, $NaF_2^-$, $CaF_2$, and free electrons ($e^-$) are taken into account in the computation.

The equilibrium composition results show that in the vortex flow region where there is a high concentration of the fluorine containing species, most of the free electrons have been attached to form $F^-$ ions. The detailed molecular mechanism of electron attachment is not computed by the method, as only the final equilibrium state is simulated. However, electron attachment is thought to be rapidly accomplished by means of dissociative attachment reactions with the various carbon-fluorine species—for example, reactions such as: $C_2F_6+e^-=C_2F_5+F^-$, $CF_4+e^-=CF_2+F^-$, $CF_3+e^-=CF_2+F^-$, and, in general, $C_xF_y+e^-=C_xF_{y-1}+F^-$. In dissociative attachment reactions, the excess energy of the ion collision is absorbed by the dissociation energy of the molecular bond breaking. This makes the reaction a fast process.

Also shown in FIG. 4 is a communication antenna 420 mounted at the posterior or base 210 of the reentry vehicle 110. The communication antenna 420 is used to transmit and receive RF signals that are used to control the reentry vehicle 110. Thus, communication disruption due to plasma attenuation of RF signals to and from the communication antenna 420 is reduced by hexafluoroethane ($C_2F_6$) gas injection. Although hexafluoroethane ($C_2F_6$) gas injectant is used in one embodiment, it should be understood that the electrophilic injectant can be any electrophilic substance known to those skilled in the art, including, but not limited to, sulphur hexafluoride ($SF_6$), and other fluorocarbons such as HFCs, PFCs, HCFCs.

In addition, the location of the communication antenna 420 at the base 210 of the reentry vehicle 110 is shown as one embodiment herein for the purpose of illustration, and is not meant to limit the scope of the present invention. Throughout the discussions presented herein, the present invention contemplates any location of the communication antenna deemed appropriate by those skilled in the art, with electrophilic injectant injected in the vicinity thereof.

Furthermore, the flight vehicle of the present invention can be a reentry vehicle for a missile system, a space shuttle, a space capsule, or a landing module without departing from the scope of the present invention. When applied to space shuttles or space capsules, the present invention can make space flights safer by enabling communication with the reentry vehicles during the critical phase of reentry into atmosphere.

Although the description provided herein is in the context of reentry into the Earth atmosphere, the utility and applicability of the present invention are not limited to this particular context. As discussed above, plasma is produced as the result of large shockwaves set off by a body moving at a hypersonic speed. A hypersonic speed is defined as the speed more than five times the speed of sound. In the context of the Earth atmosphere, the plasma effect typically starts to show around Mach 8, i.e., eight times the speed of sound. Regardless, the present invention can be employed to improve communication with the hypersonic flight vehicle whenever there is a plasma induced communication disruption. For example, flight vehicles such as hypersonic scramjets that can reach any target on Earth in less than two hours, boost glide vehicles, and missile interceptors all could conceivably reach speeds exceeding Mach 8 while still in the atmosphere, and hence could encounter the problems due to plasma induced communication disruption. Moreover, the application of the present invention need not be limited to the Earth terrestrial environment. For instance, the present invention can be employed for a Mars mission to improve communication with the landing module during descent and entry into Mars atmosphere. The planet Mars has a significant atmosphere which is, although thinner than that of Earth, sufficient to produce plasma effect during entry or reentry into Martian atmosphere. In general, the present invention can be utilized whenever there is communication disruption by attenuation of communication signals by plasma effect.

A further benefit of injecting electrophilic gas into plasma is reduction in plasma temperature. Injecting a cool gas into the hot region reduces the temperature of the region simply by mixing. The attached electrons are more stable (i.e., have less tendency to detach again from the $F^-$ ions) as the temperature is decreased, facilitating the suppression process.

Figure 5:
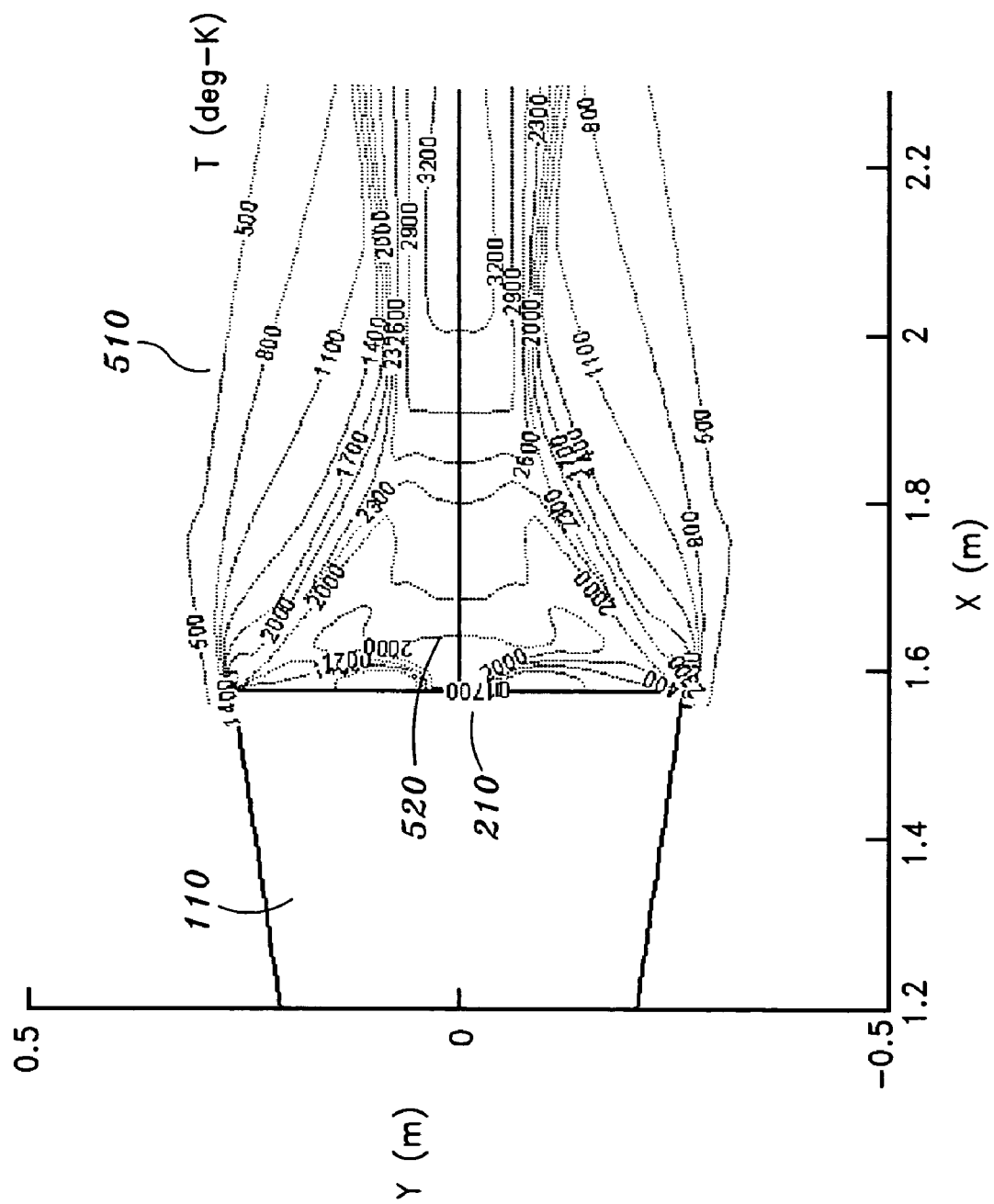
FIG. 5 illustrates temperature distribution in the wake of a reentry vehicle when hexafluoroethane (C2F6) gas is injected into plasma near the base of the reentry vehicle according to the one embodiment of the present invention.

FIG. 5 illustrates temperature distribution in the wake of a reentry vehicle when hexafluoroethane ($C_2F_6$) gas is injected into plasma near the base of the reentry vehicle according to one embodiment of the present invention. Shown in FIG. 5 are temperature contours 510 near the base 210 of the reentry vehicle 110 at 42 Kft altitude during reentry when hexafluoroethane ($C_2F_6$) gas is injected into the plasma near the base 210 of the reentry vehicle 110 at the rate of 100 grams per second. In particular, FIG. 5 shows temperature contour for 2000 degree Kelvin 520 near the base 210 of the reentry vehicle 110. As shown in FIG. 5, the plasma temperatures near the base 210 of the reentry vehicle 110 are 2000 degree Kelvin or less with $C_2F_6$ injection, which is much lower than 2600 degree Kelvin around the same region without $C_2F_6$ injection as shown in FIG. 2.

In another embodiment, a method for reducing plasma induced communication disruption at a hypersonic speed is provided. The method comprises injecting an electrophilic gas into plasma near a communication antenna, wherein the electrophilic gas is injected into a separated-flow vortex near the communication antenna. Separated-flow vortices, also known as eddies, are a phenomenon in turbulent flows where local vortices are formed by local flow fields separated from the rest of flows. Because of the separated flow characteristics of eddies, materials entrained in eddy vortices tend to remain within the vortices. Thus, by injecting electrophilic gas into a separated-flow vortex near the communication antenna, the reduction of plasma attenuation effect can be made more efficient, as the electrophilic injectant entrained in the separated-flow vortex tends to remain near the communication antenna without being swept away by the turbulent flow currents around the reentry vehicle.

Figure 6:
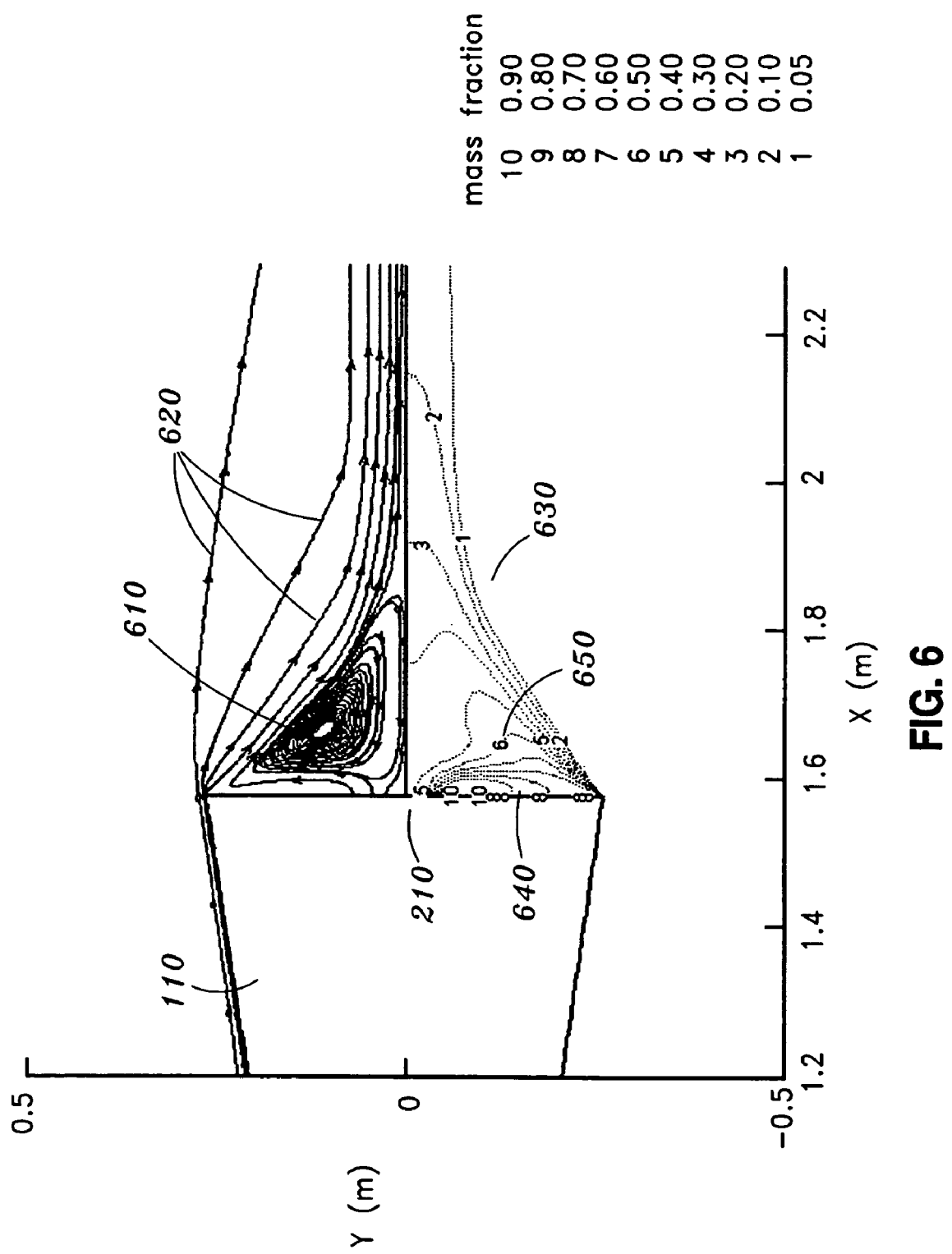
FIG. 6 illustrates a separated-flow vortex formed near the base of a reentry vehicle, and a high concentration of C2F6 gas injectant remaining entrained in the separated-flow vortex when the C2F6 gas is injected into the separated-flow vortex near the communication antenna according to one embodiment of the present invention.

FIG. 6 illustrates a separated-flow vortex formed near the base of a reentry vehicle, and a high concentration of $C_2F_6$ gas injectant remaining entrained in the separated-flow vortex when the $C_2F_6$ gas is injected into the separated-flow vortex near the communication antenna according to one embodiment of the present invention. As shown in the upper half of FIG. 6, separated-flow vortex 610 is formed near the base 210 of the reentry vehicle 110. Because the reentry vehicle 110 is symmetric about center line 114, the flow lines for the lower half would be the exact mirror image of the upper half. The flow lines 620 in FIG. 6 are computed utilizing computational fluid dynamics simulations (CFD) well known to those skilled in the art.

Shown in the lower half of FIG. 6 are $C_2F_6$ injected mass density fraction contours 630 as a ratio to the total mass density in the flow field. In particular, FIG. 6 shows $C_2F_6$ mass density fraction contour for 0.7 fraction 640, and $C_2F_6$ mass density fraction contour for 0.5 fraction 650 near the base 210 of the reentry vehicle 110, and near where separated-flow vortex would be at the lower half. Thus, FIG. 6 shows relatively high concentration of $C_2F_6$ gas injectant remaining entrained in the separated-flow vortex when the $C_2F_6$ gas is injected into the separated-flow vortex near the communication antenna.

The mass density fractions shown in FIG. 6 are computed as part of the CFD solution, where three gas constituents, as defined by their respective sets of chemical elements, are tracked by the CFD mass conservation equations. Gas 1 is air (i.e. N and O in air proportions), Gas 2 the ablation products being burned off the TPS(H, C, O, N, Na, Ca, K in the mass proportions representing the TPS material), and Gas 3 is the electrophilic gas injectant (C and F in mass proportions representing $C_2F_6$). The latter two gas constituents are injected into Gas 1 (the air) as it flows around the vehicle. Gas 2 is injected over the area on the sides of the vehicle, and Gas 3 is injected in a small ring area on the base of the vehicle. The three gas constituents diffuse together in proportions as dictated by the CFD simulation solution. The relative densities of Gas 1, Gas 2, and Gas 3 at any point in the flow field determine the elements composition at that point. From that and the temperature and pressure in the flow field, the equilibrium chemistry solution yields the molecular species and ion concentrations. This is all solved in a coupled iterative calculation. The flow field is determined in a quasi-steady time asymptotic CFD computation. At every point in the flow field, the mass fractional amounts of the injected gas density (Gas 3) compared to the total gas present (Gas 1+Gas 2+Gas 3) can be computed, which is the mass fraction plotted in FIG. 6. It is a rough measure of how dominant the fluorine containing species are compared to the air and heat shield derived species. However, the elements from all three gases are in reality all reacted together to form a soup of molecules containing elements from all of them. HF, for example, contains hydrogen from the TPS ablation and fluorine from the $C_2F_6$. In the descriptions following, injectant Gas 3 mass fraction is referred to as the $C_2F_6$ mass density even though the $C_2F_6$ is mostly dissociated and the C and F elements from it are reacted to now reside in many other molecular species.

Figure 7:
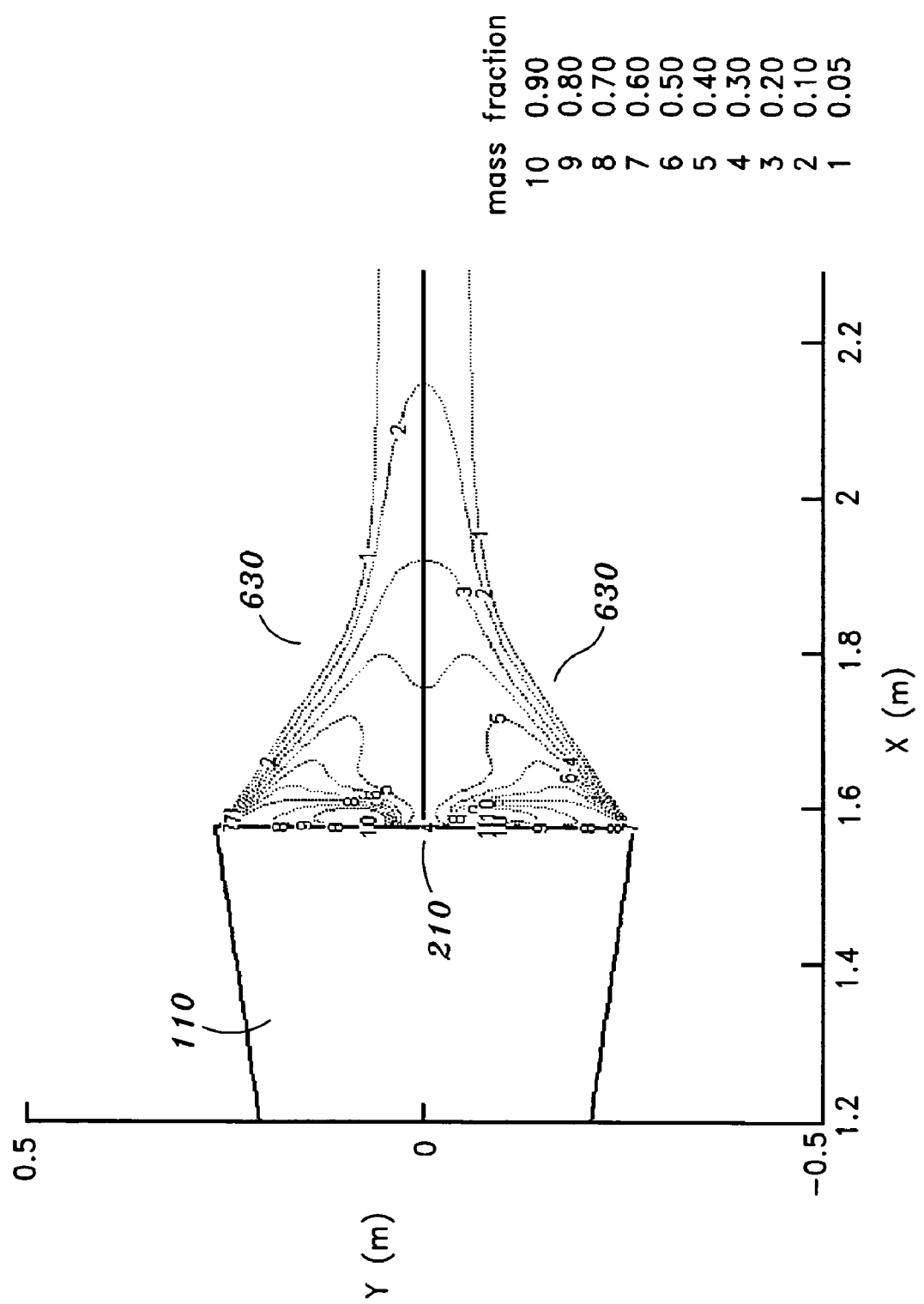
FIG. 7 illustrates hexafluoroethane (C2F6) gas density distribution when the C2F6 gas is injected into the separated-flow vortex near a base-mounted communication antenna according to one embodiment of the present invention.

FIG. 7 illustrates hexafluoroethane ($C_2F_6$) gas density distribution when the $C_2F_6$ gas is injected into the separated-flow vortex near a base-mounted communication antenna according to one embodiment of the present invention. Shown in FIG. 7 are $C_2F_6$ mass density fraction contours 630 as a ratio to the $C_2F_6$ mass density upon injection. Unlike FIG. 6, full $C_2F_6$ mass density fraction contours for both upper and lower halves are shown in FIG. 7, demonstrating a high concentration of $C_2F_6$ gas injectant remaining entrained in the separated-flow vortex when the $C_2F_6$ gas is injected into the separated-flow vortex.

Although one embodiment of the present invention is shown herein where the communication antenna is placed at the base of a reentry vehicle and electrophilic injectant is injected into a separated-flow vortex near the base of the reentry vehicle, the present invention is not limited to this particular embodiment. The present invention contemplates utilizing injecting electrophilic injectant into a separated-flow vortex near a communication antenna wherever the separated-flow vortex can be made to occur near a communication antenna.

Figures 8A, 8B:
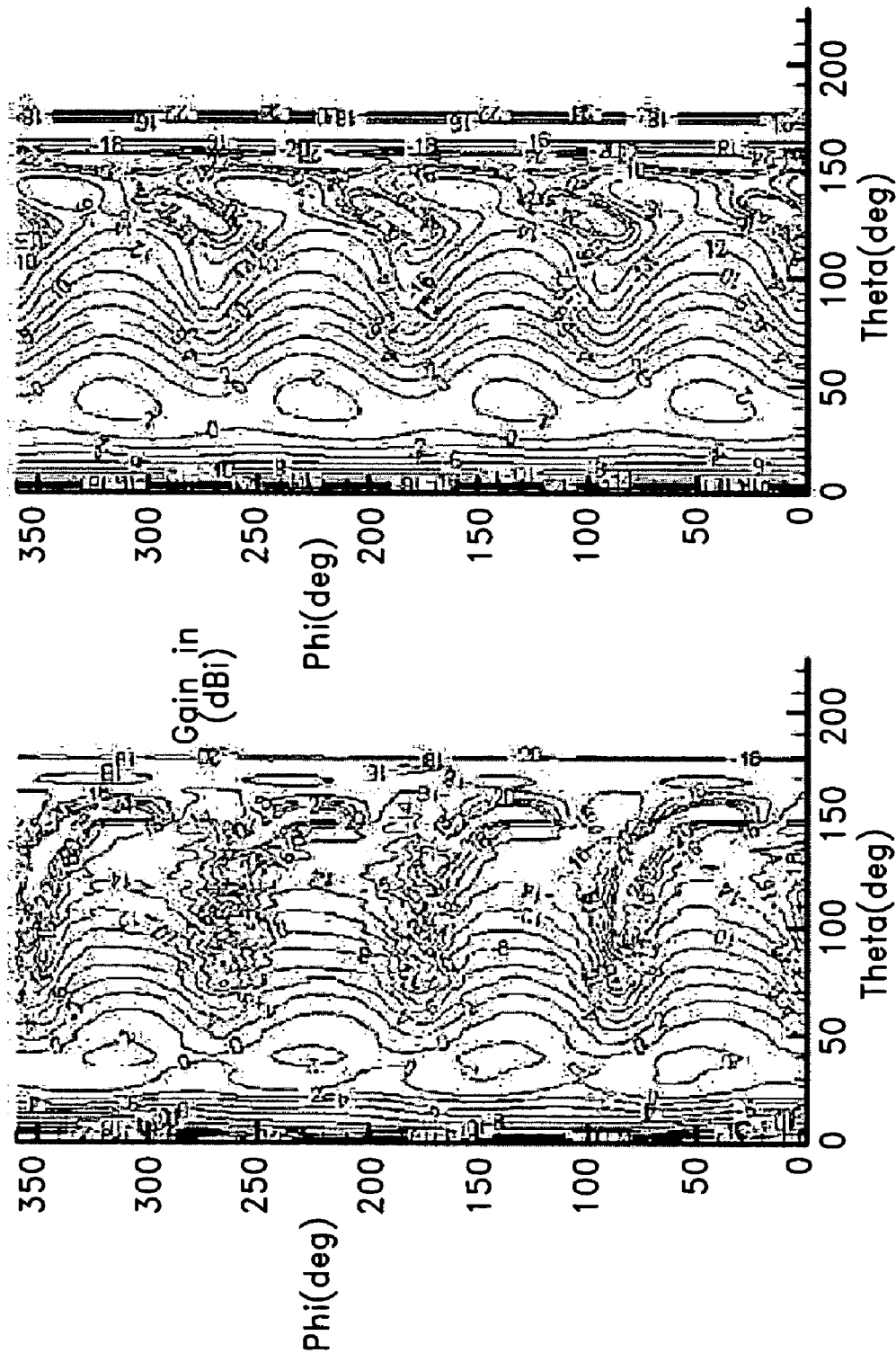
FIG. 8a shows a directional gain plot for a test signal received or transmitted by a reentry vehicle measured at a ground test facility.
FIG. 8b shows a predicted directional gain plot for a test signal received or transmitted by a reentry vehicle calculated by a computational method.

FIG. 8a shows a directional gain plot for a test signal received or transmitted by a reentry vehicle measured at a ground test facility. As well known to those skilled in the art, a directional gain plot is a plot of relative gains in reference to an isotropic radiator (dBi) as a function of directional coordinates. Shown in FIG. 8a is a directional gain plot represented in angular coordinates, where the directional angle (theta, $\theta$) ranges from 0 to 180 degrees, and the azimuthal angle (phi, $\phi$) ranges from 0 to 360 degrees.

FIG. 8b shows a predicted directional gain plot for a test signal received or transmitted by a reentry vehicle calculated by a computational method. The computational method used is a solution of Maxwell's equations for the antenna geometry specified, utilizing a technique known as the method-of-moments well known to those skilled in the art. As shown in FIG. 8b, the predictions of the computational method track very closely empirical measurements shown in FIG. 8a.

However, this comparison is for a case without any plasma, and hence it only gives partial validation of the computational method. To take plasma into account, the method further considers the complex dielectric constant $\epsilon_p$ distribution (or permittivity) of the plasma in the flow field region over the antenna in the electromagnetic computation. The complex dielectric constant of a plasma is a function of the plasma frequency $\omega_p$ (computed from electron density) and the electron-neutral collision frequency $\nu$ in the flow field as follows:

$$\varepsilon_p = \varepsilon_0 \left[ 1 - \frac{\omega_p^2}{\omega(\omega - i\nu)} \right],$$

where, $\epsilon_0$ is the free space dielectric constant, $\omega$ is the signal frequency, and $i=\sqrt{-1}$. The electron density is given by the CFD as discussed above. The electron-neutral collision frequency is dependent on the thermal velocity of the electrons, the collision diameters of the neutral molecules, and the gas density. It may be easily computed at any point from the CFD temperature, pressure, and composition using well known formulas.

FIG. 9 illustrates a close match between the empirically observed plasma attenuation of signals from a reentry vehicle during reentry and the predictions of the computational method. Shown in FIG. 9 are empirically observed signals 910 from a reentry vehicle during reentry (in solid line), and predicted values from the computational method 920 (in dashed line). The predicted curve 920 is derived from a series of plasma influenced antenna gain patterns computed as above, with the predicted plasmas from the CFD for a set of times along X-axis. At any time, the altitude, flight velocity, and other information to do the CFD base flow plasma computation are known or can be calculated with well known reentry engineering codes (e.g., the TPS ablation rates). Likewise, known is the slant-range from the reentry vehicle to the receiving antenna, in this case on the ground, which also enters the signal strength prediction. Finally, the aspect angle of view with the vehicle determines where in the antenna pattern (i.e., what gain value) the receiver sits. The X-axis 930 represents time to impact for the reentry vehicle in seconds, and the Y-axis 940 represents signal strength in dBm. As shown in FIG. 9, empirically observed signals 910 match closely predicted values from the computational method 920, including reduction of signal strength 950 due to plasma attenuation during reentry. This validates the computational method when plasma is present.

FIG. 10a shows a predicted directional gain plot for signals received or transmitted by a reentry vehicle calculated by a computational method without accounting for plasma effect. Shown in FIG. 10a are predicted directional gains computed without plasma attenuation to serve as a reference point.

FIG. 10b illustrates communication disruption effect of plasma for a blunt nose reentry vehicle during reentry. A blunt nose has a larger nose radius—a size more typically used on reentry vehicles—than the sharp nose described below. Shown in FIG. 10b are predicted directional gains with plasma attenuation taken into account for a blunt nose vehicle at 80 Kft altitude during reentry. As shown in FIG. 10b, there is a narrow region 1010 where the gains are higher than −18 dBi (negative 18 dBi) required to maintain a GPS communication link. The gains are higher than −18 dBi inside the region bound by −18 dBi lines 1020.

Figure 11:
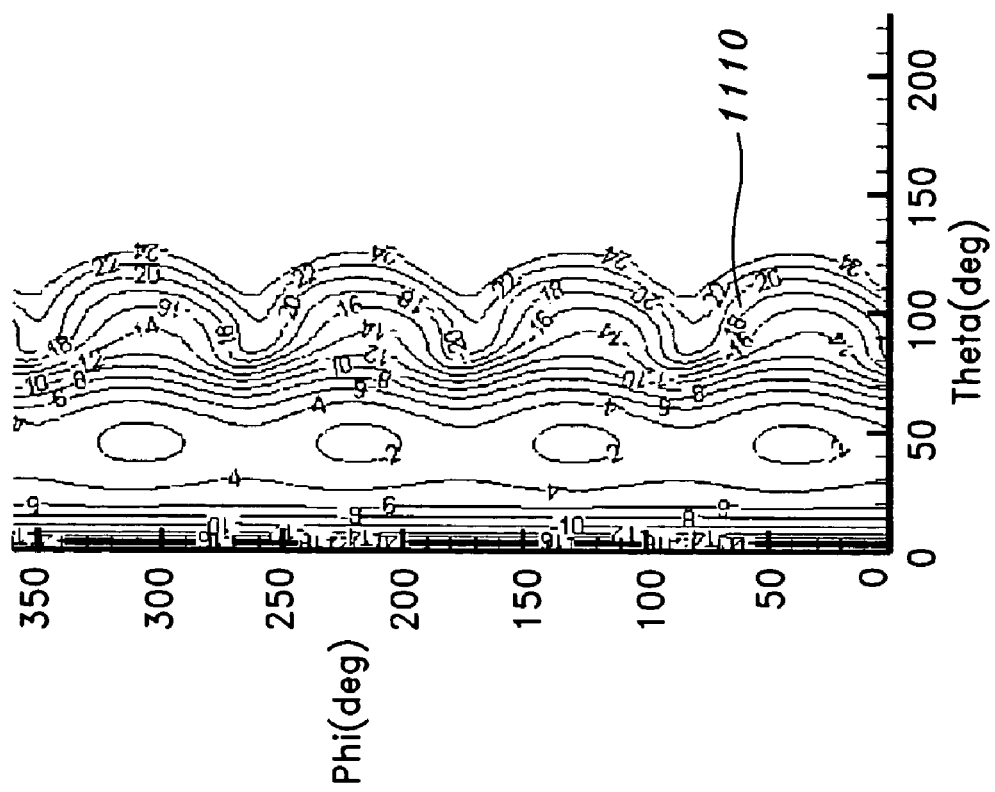
FIG. 11 illustrates reduction of plasma induced communication disruption when injecting $C_2F_6$ gas for a sharp nose reentry vehicle according to one embodiment of the present invention.

FIG. 11 illustrates reduction of plasma induced communication disruption when injecting $C_2F_6$ gas for a sharp nose reentry vehicle according to one embodiment of the present invention. As discussed above, reduction of plasma attenuation is expected when $C_2F_6$ gas is injected into plasma because of creation of electron free region as shown in FIG. 4. FIG. 11 directly demonstrates reduction of plasma induced communication disruption when injecting $C_2F_6$ gas into plasma. Shown in FIG. 11 are directional gains for a sharp nose reentry vehicle at 50 Kft altitude during reentry with $C_2F_6$ gas injection at the rate of 100 grams/sec. As shown in FIG. 11, a wide region exists where the directional gains are higher than −18 dBi, as indicated by −18 dBi line (1110). The reduction of plasma induced communication disruption shown in FIG. 11 is due to $C_2F_6$ gas injection in part and a sharp nose shaping in part. The sharp nose used for computation for FIG. 11 directional gain plot is a multi-section sharp nose described below.

Figure 12:
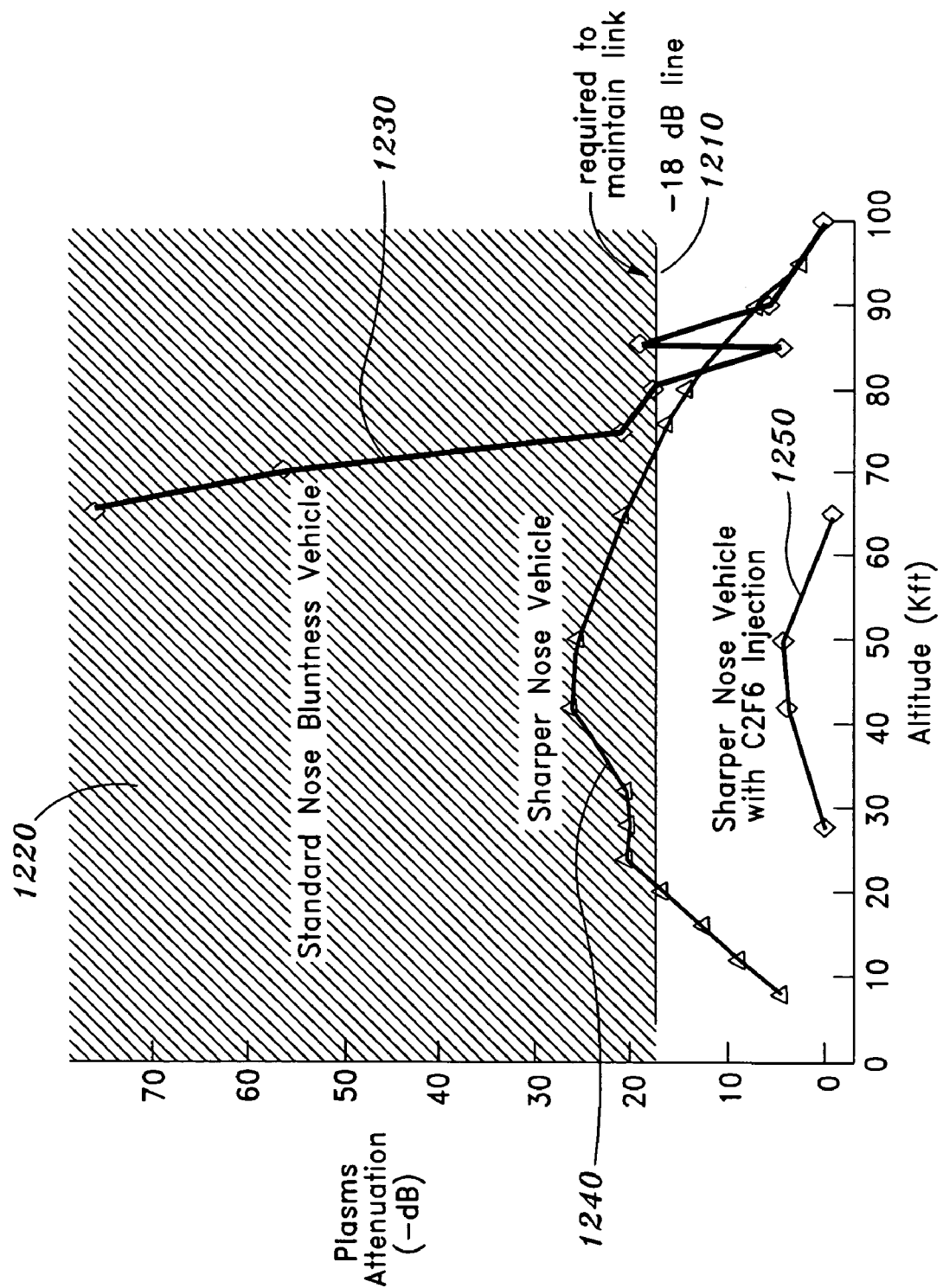
FIG. 12 illustrates reduction of plasma induced communication disruption when a multi-section sharp nose is used for a reentry vehicle and elimination of plasma induced GPS blackout during reentry for a multi-section sharp nose reentry vehicle when C2F6 gas is injected, according to one embodiment of the present invention.

FIG. 12 illustrates reduction of plasma induced communication disruption when a multi-section sharp nose is used for a reentry vehicle according to the present invention, and elimination of plasma induced GPS blackout during reentry for a sharp nose reentry vehicle when $C_2F_6$ gas is injected according to the present invention. Shown in FIG. 12 are plasma attenuation plots in −dB (negative gain) as a function of altitude in Kft during reentry according to the previously described computational method. The data for all three curves in FIG. 12 are computed using the same method. For simpler presentation of the data and making a comparison, the antenna gain pattern data is converted to "plasma attenuation" which is defined as the gain with plasma minus the gain without plasma. It represents a gain difference due to the plasma (dB) rather than a pure antenna gain with respect to an isotropic radiator (dBi). As a further simplification, the gain only at a reference point in the pattern is selected to reduce the comparison at each altitude to one number instead of an entire pattern of numbers. This is a representative point in the pattern for making a comparison. The three curves shown are for the standard blunt nose reentry vehicle (1230), the sharp nose reentry vehicle without any $C_2F_6$ injection (1240), and the sharp nose reentry vehicle with $C_2F_6$ injection at a rate of 100 grams/sec (1250). The −18 dB line (1210) on this graph represents an empirical line derived from the standard blunt nose vehicle flight test data in that the GPS communications were lost at an altitude near 80 Kft, where the attenuation is predicted to be −18 dB. This −18 dB attenuation line is close to but not the same as −18 dBi. It actually represents only a −15.4 dBi antenna gain value, since the "without plasma" antenna gain at the reference point (θ=40, φ=225) is +2.6 dBi. It is therefore a more conservative value to use in forecasting when GPS communications will be lost. The multi-section sharp nose used for computation here is described below.

FIG. 12 shows ~18 dB line (1210) and GPS blackout region (1220) which is the region above −18 dB line (1210). Whenever plasma attenuation for a reentry vehicle is in GPS blackout region (1220), a reentry vehicle is predicted to experience a complete failure or breakdown of communication with GPS satellites, a condition known as GPS blackout.

According to another aspect of the invention, the present invention is a multi-section sharp nose for a reentry vehicle for reducing plasma induced communication disruption during reentry, comprising two or more nose cone sections, wherein a sharper nose cone section is placed in front of a less sharp nose cone section.

Shown in FIG. 12 is plasma attenuation plot for a blunt nose vehicle (1230), which shows GPS blackout during reentry after 80 Kft altitude. Also shown in FIG. 12 is plasma attenuation plot for a sharp nose vehicle (1240), demonstrating a significant reduction in plasma induced communication disruption when a multi-section sharp nose is utilized for the reentry vehicle according to the present invention. As shown in FIG. 12, although GPS blackout is still expected between 75 Kft and 20 Kft, the portion of flight in GPS blackout is reduced for a sharp nose reentry vehicle compared to a blunt nosed vehicle.

Figure 13:
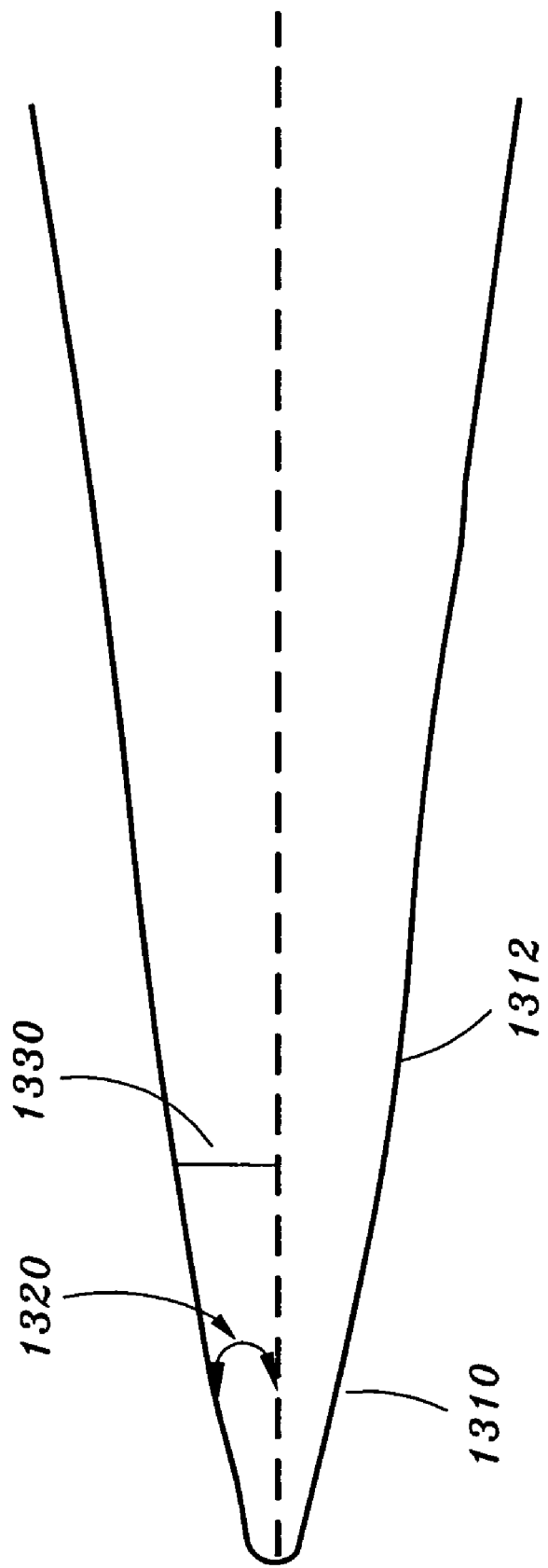
FIG. 13 illustrates a biconic shape for a multi-section sharp nose of a reentry vehicle according to one embodiment of the present invention.

FIG. 13 illustrates a biconic shape for a multi-section sharp nose of a reentry vehicle according to the present invention. Shown in FIG. 13 is one embodiment for a multi-section sharp nose of a reentry vehicle according to the present invention, where the sharp nose has a biconic shape. As shown in FIG. 13, front nose cone section 1310 of the reentry vehicle has a sharper conic shape than rear nose cone section 1312, giving the reentry vehicle a "double cone" shape—that is, a biconic shape—nose. In one embodiment shown in FIG. 13, the half angle 1320 of front nose cone section 1310 is 12 degrees, and the radius of base 1330 of the sharper front nose cone is 1.18 inches for reentry vehicle 110 shown in FIG. 1. However, the scope of the present invention is not limited to a biconic shape or the exact dimensions shown in FIG. 13, which are given for the purpose of illustration. In general, the multi-section sharp nose of the present invention can have two or more nose cone sections where a sharper nose cone section is placed in front of a less sharp nose cone section.

According to yet another aspect of the invention, the present invention is a system for reducing plasma induced communication blackout for a reentry vehicle during reentry, including a multi-section sharp nose for the reentry vehicle, an electrophilic gas injectant, and an electrophilic gas injection system for injecting the electrophilic gas injectant into plasma near a communication antenna during reentry. As described above, the multi-section sharp nose and electrophilic gas injection each by itself reduces plasma induced communication disruption. Since the underlying mechanisms of the two components operate independently of each other, combining the components enhances the reduction effect according to the present invention.

According to yet another aspect of the invention, the present invention is a reentry vehicle with improved targeting accuracy utilizing a process for reducing plasma induced GPS blackout during reentry, where the reentry vehicle comprises a multi-section sharp nose provided for the reentry vehicle, and an electrophilic gas injection system provided for the reentry vehicle for injecting an electrophilic gas injectant into plasma near a GPS antenna mounted at a base of the reentry vehicle. As shown in FIG. 4, communication antenna (420) for GPS communication—a GPS antenna—is typically mounted at base (210) of reentry vehicle (110), because the GPS satellites with which the reentry vehicle communicates are orbiting in space situated above or behind the reentry vehicle during its reentry phase. As previously described, the plasma formed near base (210) of reentry vehicle (110) during reentry can severely attenuate GPS L1 frequency RF signals, disrupting GPS communication with the reentry vehicle and, in more severe cases, causing complete failure or breakdown of communication with the GPS satellites known as GPS blackout. As shown in FIG. 12, whenever plasma attenuation for a reentry vehicle is so severe to be in GPS blackout region (1220), a reentry vehicle experiences a GPS blackout. As customary in the art, reducing the portion of flight in GPS blackout region (1220) is called reducing GPS blackout. Hence, it can be said that reducing plasma attenuation effect near the base of the reentry vehicle results in reduction of plasma induced GPS blackout for a reentry vehicle during reentry. In a preferred embodiment, reducing plasma attenuation according to the present invention completely eliminates plasma induced GPS blackouts during reentry.

Shown in FIG. 12 is plasma attenuation plot (1250) for a sharp nose vehicle with a base mounted antenna and with $C_2F_6$ gas injection at the rate of 100 grams/sec according to one embodiment of the present invention. The sharp nose of the vehicle has a biconic shape with shape geometry shown in FIG. 13 and described above. As demonstrated by plasma attenuation plot 1250, the entire plot is below −18 dB line (1210) and entirely outside GPS blackout region (1220). Thus, GPS blackout during reentry is eliminated when a multi-section sharp nose and $C_2F_6$ gas injection are utilized in combination. In other words, although the sharp nose and electrophilic gas injection each by itself reduces plasma induced communication disruption, combining them further reduces or eliminates plasma induced GPS blackouts.

For the GPS-guided reentry vehicles, the GPS blackout caused by plasma effect during reentry severely undermines the targeting accuracy because the reentry vehicles cannot be guided by GPS during the critical reentry phase. Thus, by reducing the plasma induced GPS blackout during reentry, the present invention provides an effective method for improving targeting accuracy for a GPS-guided reentry vehicle. In one embodiment, reducing plasma attenuation completely eliminates plasma induced GPS blackouts during reentry as described above, further improving targeting accuracy for a GPS-guided reentry vehicle. However, even where the present invention does not completely eliminate plasma induced GPS blackouts, e.g., under very high velocity reentry conditions, the present invention can be partially effective and thereby improve targeting accuracy by reducing plasma induced GPS blackout during reentry—that is, reducing the portion of flight in GPS blackout region 1220.

Figure 14:
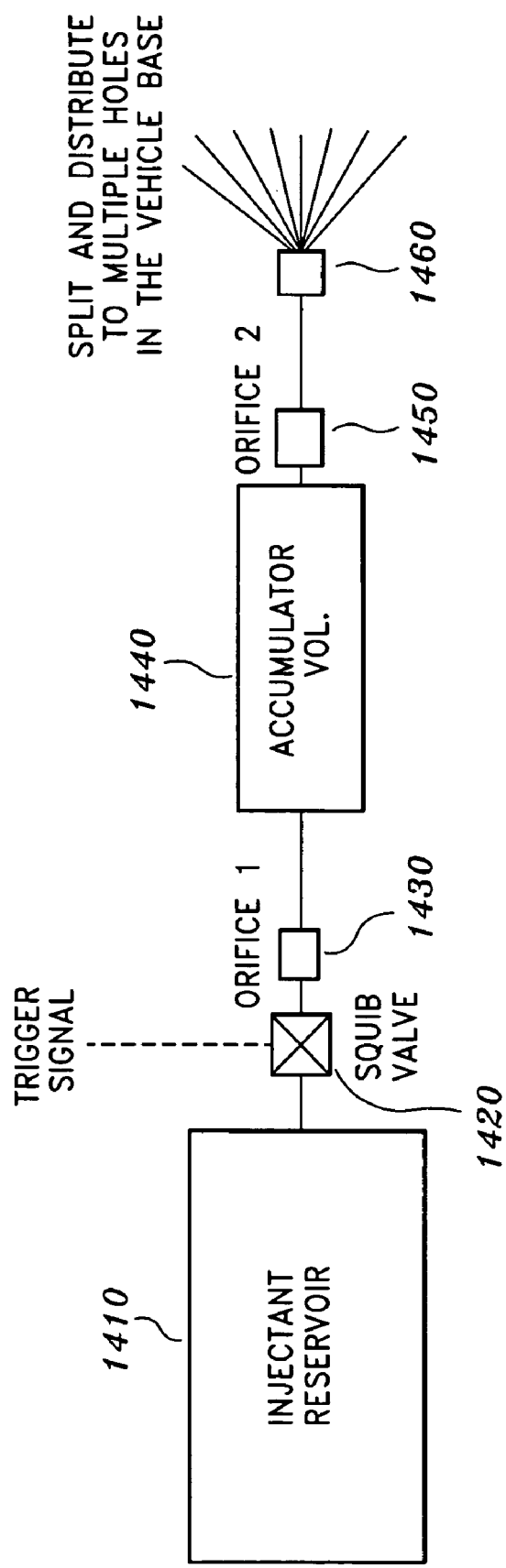
FIG. 14 illustrates an embodiment of the electrophilic gas injection system according to the present invention.

FIG. 14 illustrates an embodiment of the electrophilic gas injection system according to the present invention. The electrophilic gas injection system includes an injectant reservoir 1410 containing electrophilic gas injectant, a squib valve 1420, a first orifice 1430, an accumulator vessel 1440, a second orifice 1450, and an exit port 1460. The squib valve 1420 is used to control injection of the electrophilic gas injectant from the injectant reservoir 1410 into the accumulator vessel 1440 via the first orifice 1430. The electrophilic gas injectant stored in the accumulator vessel 1440 is then delivered to the exit port 1460 via the second orifice 1450 for injection into the plasma to create a low plasma region. Based on the disclosure and teachings provided herein, a person of ordinary skill in the art will appreciate how to select the respective sizes of the first and second orifices 1430 and 1450 are to achieve the desired flow rate.

Figure 15:
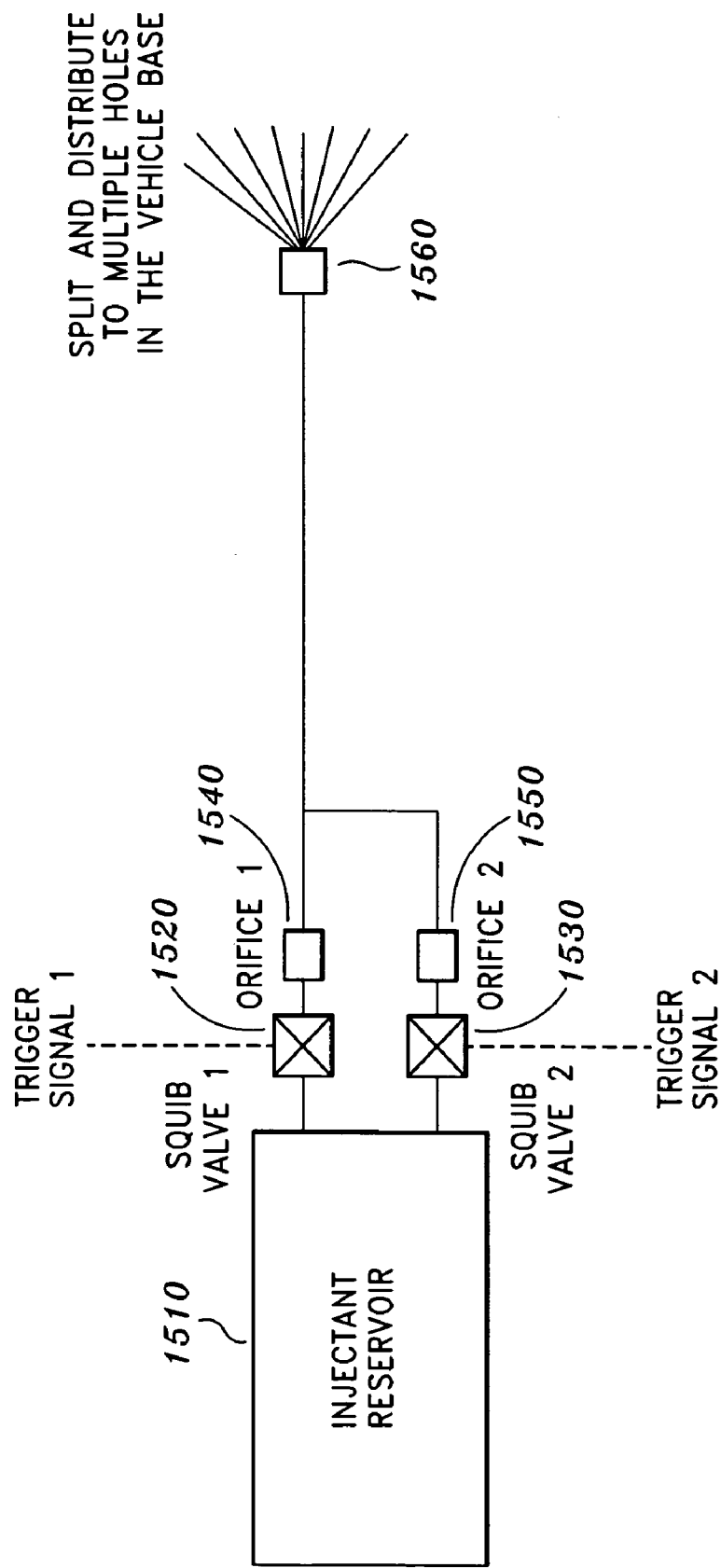
FIG. 15 illustrates another embodiment of the electrophilic gas injection system with two valves and orifices in parallel according to the present invention.

FIG. 15 illustrates an alternative embodiment of the electrophilic gas injection system with two valves and orifices in parallel. In this alternative embodiment, the electrophilic gas injection system includes an injectant reservoir 1510, a first squib valve 1520, a second squib valve 1530, a first orifice 1540, a second orifice 1550, and an exit port 1560. The first and second squib valves 1520 and 1530 are coupled to the first and second orifices 1540 and 1550 respectively. The first and second squib valves 1520 and 1530 are coupled to the injectant reservoir 1510 and are selectively used to control the flow rate of the electrophilic gas injectant out of the injectant reservoir 1510. For example, either or both of the first and second squib valves 1520 and 1530 can be used to inject electrophilic gas injectant to the exit port 1560.

Figure 16:
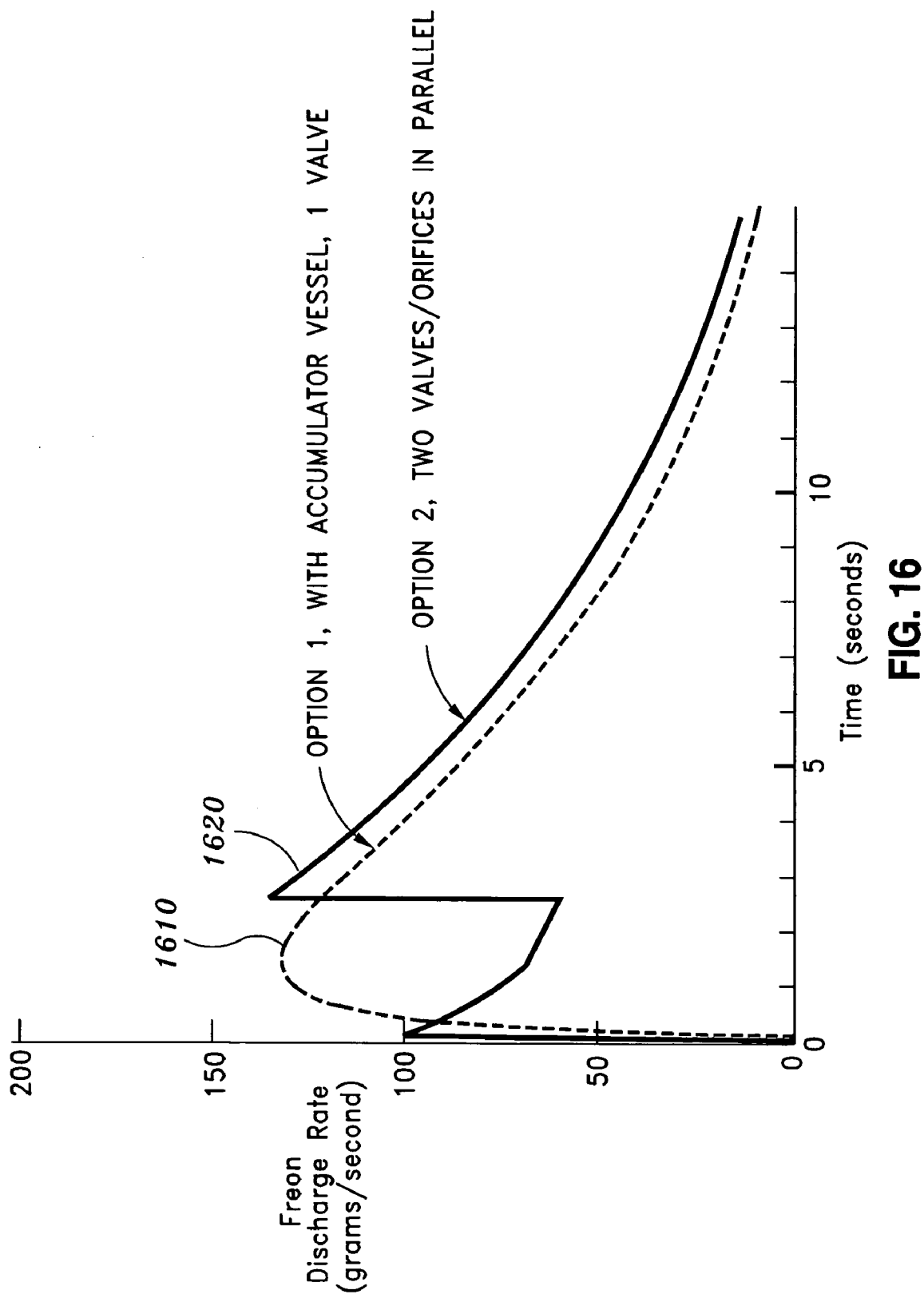
FIG. 16 illustrates discharge characteristics of two embodiments of the electrophilic gas injection system according to the present invention.

FIG. 16 illustrates discharge characteristics of two embodiments of the electrophilic gas injection system according to the present invention. Shown in FIG. 16 are discharge characteristics plot 1610 for an embodiment with an accumulator vessel as shown in FIG. 14, and discharge characteristics plot 1620 for an embodiment with two valves and orifices in parallel as shown in FIG. 15. The discharge characteristics plots are for discharge rate in grams per second versus time in seconds. Time zero represents the time the single squib valve or the first squib valve 1520 in FIG. 15 is activated and the $C_2F_6$ injection is started. The rise in the flow rate in FIG. 16 is the time the second squib valve 1530 is activated. The first squib valve activation time would be selected by the onboard computer or a timer or other means to correspond to the altitude where plasma is first expected. Activating at a 90 Kft altitude would be reasonable based on the FIG. 12 plots. Both of these embodiments aim at delaying the maximum $C_2F_6$ flow rate point to more closely match the time or altitude at which maximum plasma occurs—that is, during the phases of reentry where the plasma induced communication disruption is most severe. The two-valve embodiment has one additional moving part but offers more flexibility and avoids the second initially empty vessel.

Figure 17:
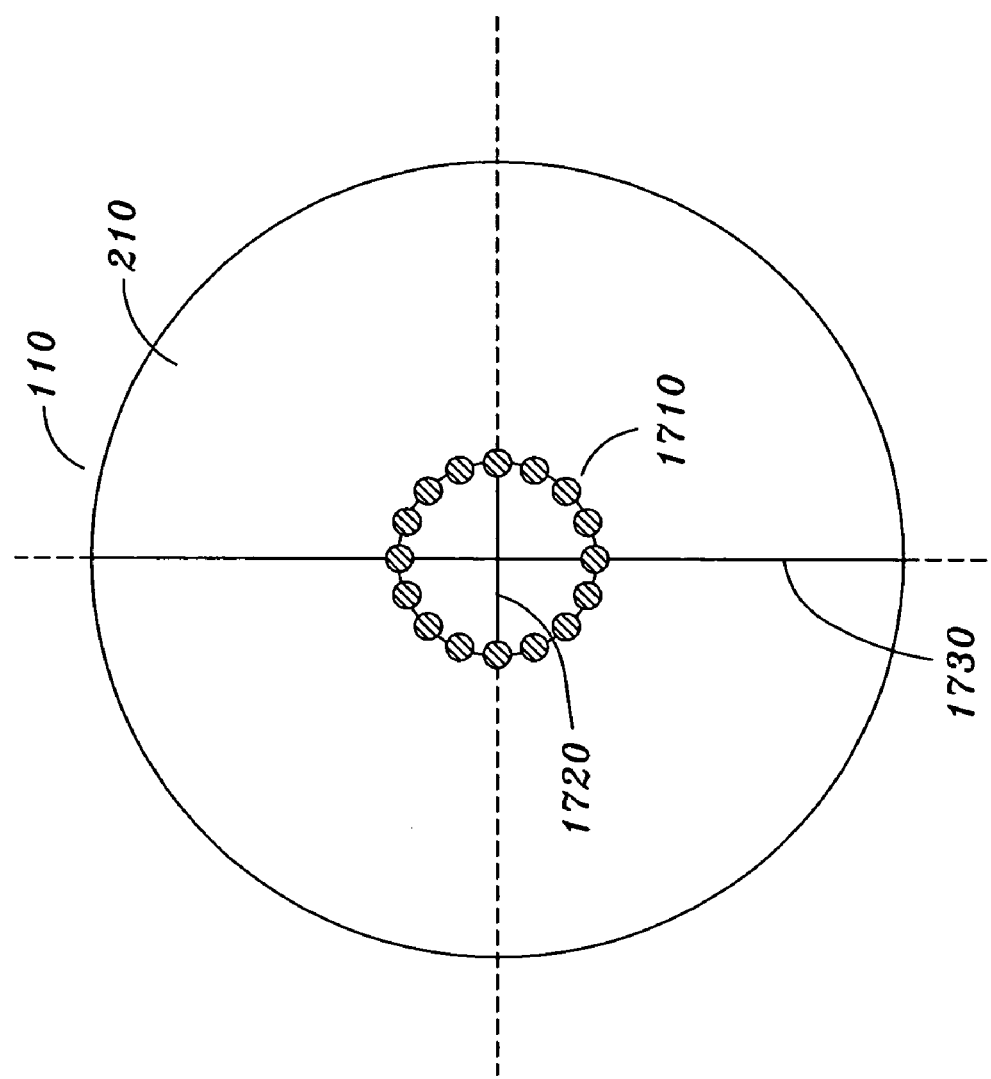
FIG. 17 illustrates an example of injection ports configuration according to the present invention.

FIG. 17 illustrates an example of injection ports configuration according to one embodiment of the present invention. Shown in FIG. 17 is a bottom view of the base 210 of the reentry vehicle 110. As shown in FIG. 17, injection of the electrophilic gas is accomplished with an arrangement of small diameter injection ports 1710 on the base 210 of the reentry vehicle 110. Due to the intense vortical flow and turbulence in the region near the base 210 of the reentry vehicle 110, injectant gas injected in a reasonably axis-symmetric pattern into the region is quickly mixed and distributed throughout the vortex. In one embodiment, as shown in FIG. 17, the injection is accomplished through a ring of twelve equally spaced 1.9 millimeter diameter injection ports 1710 concentric to the center of the base 210 of the reentry vehicle 110. Ring diameter 1720 is about one fifth of vehicle base diameter 1730.

Figure 18:
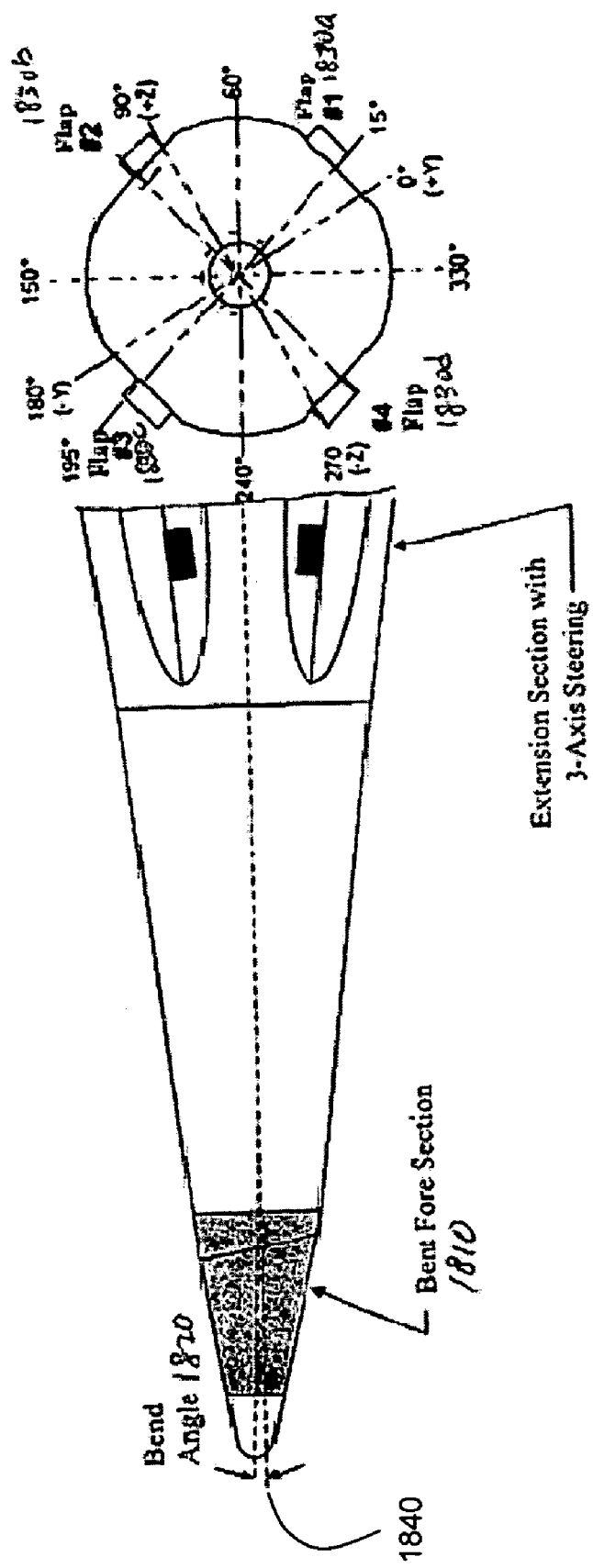
FIG. 18 illustrates one embodiment of a flight vehicle that can be used in conjunction with the electrophilic gas injection system according to the present invention.

FIG. 18 further illustrates another embodiment of a flight vehicle that can be used in conjunction with the electrophilic gas injection system according to the present invention. The flight vehicle is an reentry vehicle having a bent nose 1810 with a biconic shape and a number of flaps 1830*a-d* that can be used to achieve 3-axis steering capability.

The bent nose 1810 is offset from the reentry vehicle centerline 1840. The bend angle 1820 may vary depending on the design of each application.

The 3-axis steering capability refers to vehicle control with respect to pitch, yaw and roll. Such capability is achieved via the use of, amongst other things, a number of flaps 1830*a-d*. The flaps 1830*a-d* are positioned on the reentry vehicle orthogonally, but offset from a reentry vehicle centerline 1840. The use of the flaps 1830*a-d* provides pitch and yaw control as well as bi-directional roll control. This provides quick response and increased capability for difficult maneuvers and is useable for hypersonic/supersonic applications. Additional details and description with respect to the 3-axis steering capability can be found in commonly assigned U.S. Pat. No. 6,502,785, entitled "Three Axis Flap Control System", the disclosure of which is incorporated in its entirety by reference herein.

In the embodiment as shown in FIG. 18, combining the electrophilic gas injection system as described above with the bent biconic nose 1810 and the 3-axis steering capability further reduces plasma induced communication disruption, such as, GPS blackouts and improves maneuverability of the reentry vehicle.

In one embodiment, the present invention is implemented as part of flight software residing on a computer-readable medium executable by a processor or computer onboard the reentry vehicle. The present invention can be implemented in the form of control logic using software, hardware, or a combination of both, in an integrated or modular manner. Based on the disclosure and teachings provided herein, a person of ordinary skill in the art will appreciate other ways and/or methods to implement the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A system for reducing plasma induced communication blackout during reentry, comprising:
   a reentry vehicle having a biconic nose, a base opposite the biconic nose, a communication antenna on the base, and a plurality of flaps configured to provide 3-axis steering capability;
   an electrophilic gas injectant; and
   an electrophilic gas injection system having at least one exit port in the base for injecting the electrophilic gas injectant into plasma near the communication antenna to reduce free electrons in the plasma.

2. The system of claim 1, wherein the electrophilic gas injectant is injected into a separated-flow vortex near the communication antenna.

3. The system of claim 1, wherein the biconic nose has a bend angle.

4. The system of claim 1, wherein the electrophilic gas injectant is hexafluoroethane.

5. The system of claim 1, wherein the communications with the reentry vehicle further includes a global positioning system (GPS).

* * * * *

UNITED STATES PATENT AND TRADEMARK OFFICE
CERTIFICATE OF CORRECTION

| | | |
|---|---|---|
| PATENT NO. | : 7,267,303 B1 | Page 1 of 1 |
| APPLICATION NO. | : 10/990393 | |
| DATED | : September 11, 2007 | |
| INVENTOR(S) | : Roger D. Teter et al. | |

It is certified that error appears in the above-identified patent and that said Letters Patent is hereby corrected as shown below:

In claim 5, column 16, lines 30-31 "wherein the communications with the reentry vehicle" should read -- wherein the reentry vehicle --.

Signed and Sealed this

Fifth Day of August, 2008

JON W. DUDAS
*Director of the United States Patent and Trademark Office*